US012335446B2

(12) United States Patent
Matsumoto et al.

(10) Patent No.: US 12,335,446 B2
(45) Date of Patent: Jun. 17, 2025

(54) IMAGE READING APPARATUS AND IMAGE FORMING APPARATUS COMPRISING A READING PORTION, A FIRST COVER, A SECOND COVER AND HOLDING MECHANISM CONFIGURED TO PREVENT THE FIRST COVER FROM MOVING TO A SECOND CLOSED POSITION AND HOLD THE FIRST COVER IN THE SECOND OPEN POSITION

(71) Applicant: CANON KABUSHIKI KAISHA, Tokyo (JP)

(72) Inventors: Akira Matsumoto, Ibaraki (JP); Takayuki Fukushima, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/464,612

(22) Filed: Sep. 11, 2023

(65) Prior Publication Data
US 2024/0098195 A1 Mar. 21, 2024

(30) Foreign Application Priority Data

Sep. 16, 2022 (JP) ................. 2022-147718
Jun. 16, 2023 (JP) ................. 2023-099422

(51) Int. Cl.
*H04N 1/203* (2006.01)
*H04N 1/00* (2006.01)
*H04N 1/19* (2006.01)

(52) U.S. Cl.
CPC ..... *H04N 1/00554* (2013.01); *H04N 1/00559* (2013.01); *H04N 1/1903* (2013.01);
(Continued)

(58) Field of Classification Search
CPC ........... H04N 1/00554; H04N 1/00559; H04N 1/1903; H04N 1/2032; H04N 1/1031; H04N 2201/0422; H04N 2201/0094
(Continued)

(56) References Cited

U.S. PATENT DOCUMENTS

| 4,754,337 A | 6/1988 | Nohtomi et al. |
| 7,324,781 B2 | 1/2008 | Nose et al. |

(Continued)

FOREIGN PATENT DOCUMENTS

JP 2005194011 A 7/2005

*Primary Examiner* — Chad Dickerson
(74) *Attorney, Agent, or Firm* — ROSSI, KIMMS & McDOWELL LLP

(57) ABSTRACT

An image reading apparatus includes a support portion, a reading portion, a first cover, a second cover, and a holding mechanism. The first cover moves between a second closed position where the first cover covers the reading portion in a first closed position and a second open position where the first cover opens the reading portion. The second cover moves between a third closed position where the second cover forms a second area of a conveyance path together with the first cover in the second closed position and a third open position where the second cover opens the second area. The holding mechanism prevents the first cover from moving from the second open position to the second closed position and holds the first cover in the second open position when the second cover is in the third open position and the first cover is in the second open position.

11 Claims, 33 Drawing Sheets

(52) U.S. Cl.
CPC ............... *H04N 2201/0094* (2013.01); *H04N 2201/0422* (2013.01)

(58) Field of Classification Search
USPC ............................. 358/474, 505, 408, 496
See application file for complete search history.

(56) References Cited

U.S. PATENT DOCUMENTS

| | | | |
|---|---|---|---|
| 12,028,495 B2* | 7/2024 | Matsumoto | ........ H04N 1/00554 |
| 12,075,012 B2* | 8/2024 | Yamada | ............... H04N 1/0057 |
| 2004/0223796 A1 | 11/2004 | Iwata | |
| 2024/0098199 A1* | 3/2024 | Matsumoto | .......... H04N 1/1235 |

* cited by examiner

IMAGE READING APPARATUS AND IMAGE FORMING APPARATUS COMPRISING A READING PORTION, A FIRST COVER, A SECOND COVER AND HOLDING MECHANISM CONFIGURED TO PREVENT THE FIRST COVER FROM MOVING TO A SECOND CLOSED POSITION AND HOLD THE FIRST COVER IN THE SECOND OPEN POSITION

BACKGROUND OF THE INVENTION

Field of the Invention

The present invention relates to an image reading apparatus which reads images from documents, and an image forming apparatus to which the image reading apparatus is applied.

Description of the Related Art

Image reading apparatuses disposed in image forming apparatuses, such as copying machines and printers, and including an automatic document conveyance apparatus have been widespread. The automatic document conveyance apparatus serves as a sheet conveyance apparatus; and separates a document (hereinafter referred to also as a sheet), one by one, from other documents placed on a document tray and conveys the document. Japanese Patent Application Publication No. 2005-194011 discloses an image reading apparatus that is being developed and that includes a second reading unit in addition to a first reading unit disposed in a reader that includes a glass on which a document is placed. The second reading unit is disposed in the automatic document conveyance apparatus. This configuration enables the 1-pass duplex scanning, which is a function that can read image information of both sides of a document for duplex scanning, without reversing the document.

The image reading apparatus includes a support portion that includes a frame, a pivot portion that accommodates a second reading unit and that can pivot with respect to the support portion, and an outer cover that forms an upper conveyance path between the outer cover and both the support portion and the pivot portion. The pivot portion serves as a reading portion, accommodates the second reading unit, and forms the upper conveyance path between the pivot portion and the outer cover. Thus, the pivot portion is made larger. By the way, there is a case in which jam handling or cleaning work is performed in a lower conveyance path to which the second reading unit is exposed. The cleaning work is performed for removing dust stuck to a document feeding-reading glass. In this case, a worker can perform the intended work by opening the lower conveyance path, by opening the outer cover and pivoting the pivot portion.

However, in the image reading apparatus described in Japanese Patent Application Publication No. 2005-194011, since the pivot portion is made larger, it is difficult to design a configuration for keeping the pivoted state. Thus, the pivot portion does not have the configuration for keeping the pivoted state. For this reason, when a user accesses the lower conveyance path to which the second reading unit is exposed, the user has to perform the jam handling or the cleaning work with one hand while holding the large pivot portion with the other hand. This causes poor workability.

An object of the present invention is to provide an image reading apparatus and an image forming apparatus that can improve the workability of work performed by a user accessing the conveyance path to which the reading portion is exposed.

SUMMARY OF THE INVENTION

According to a first aspect of the present invention, an image reading apparatus configured to read an image of a document conveyed in a conveyance path, the image reading apparatus including a support portion, a reading portion configured to pivot with respect to the support portion, move between a first closed position in which the reading portion forms a first area of the conveyance path and a first open position in which the reading portion opens the first area, and read an image of a document conveyed in the first area of the conveyance path at the first closed position, a first cover configured to pivot with respect to the support portion and move between a second closed position in which the first cover covers the reading portion located in the first closed position and a second open position in which the first cover opens the reading portion, a second cover configured to move between a third closed position in which the second cover forms a second area of the conveyance path other than the first area together with the first cover located in the second closed position and a third open position in which the second cover opens the second area, and a holding mechanism configured to prevent the first cover from moving from the second open position to the second closed position and hold the first cover in the second open position in a state where the second cover is located in the third open position and the first cover is located in the second open position.

According to a second aspect of the present invention, an image forming apparatus includes the image reading apparatus, and an image forming portion configured to form an image that has been read by the image reading apparatus, on a sheet.

Further features of the present invention will become apparent from the following description of exemplary embodiments with reference to the attached drawings.

DESCRIPTION OF THE EMBODIMENTS

Figure 1:
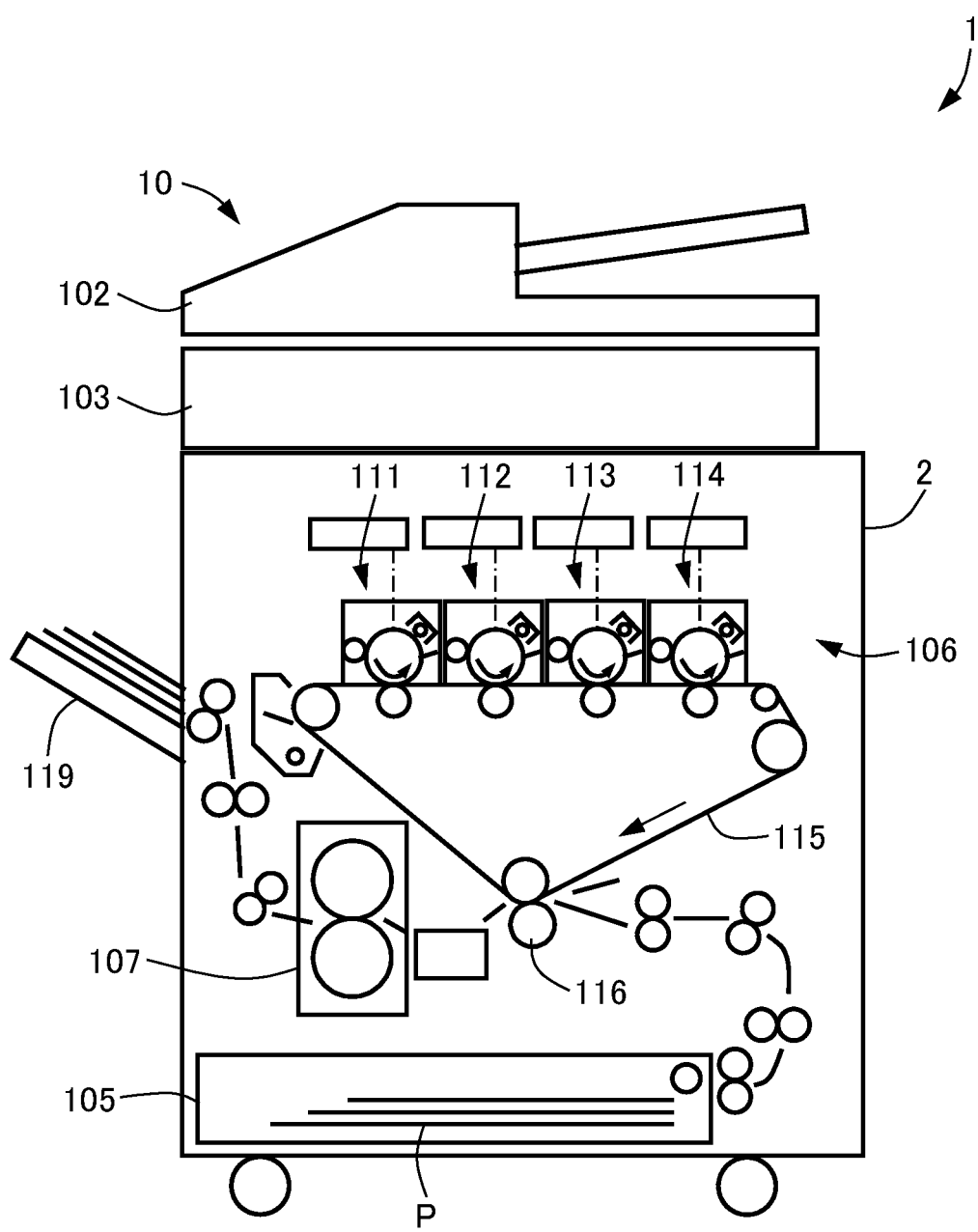
FIG. 1 is a schematic diagram illustrating an image forming apparatus of the present embodiment.

Hereinafter, the present embodiment will be described with reference to FIGS. 1 to 28. First, a schematic configuration of an image forming apparatus of the present embodiment will be described with reference to FIG. 1. FIG. 1 is a cross-sectional view illustrating an image forming apparatus 1 of the present embodiment. In the present embodiment, the image forming apparatus 1 is a full-color copying machine that includes a plurality of photosensitive drums. However, the image forming apparatus 1 is not limited to this. For example, the image forming apparatus 1 may be a monochrome or monocolor copying machine or printer that includes a single photosensitive drum, or may be an ink-jet printer.

Image Forming Apparatus

Next, the image forming apparatus 1 will be described with reference to FIG. 1. The image forming apparatus 1 has a configuration in which an image reading apparatus 10 is disposed above an image forming apparatus body 2. The image forming apparatus 1 conveys a sheet P conveyed from a sheet cassette 105, to an image forming portion 106; and forms a toner image on the sheet P Then the image forming apparatus 1 conveys the sheet P, on which the toner image has been formed in the image forming portion 106, to a fixing apparatus 107; and causes the fixing apparatus 107 to fix the toner image, still not fixed to the sheet P, to the sheet P by applying heat and pressure to the sheet P That is, the image forming portion 106 forms an image that has been read by the image reading apparatus 10, on the sheet. The sheet P may be a paper sheet such as a thin paper sheet or a thick paper sheet, a plastic film such as a sheet (OHP) used for overhead projectors, a paper sheet, such as a coated paper sheet, on which surface treatment has been performed, a specialized shape of sheet such as an envelope, or a cloth sheet.

The image forming portion 106 includes stations 111, 112, 113, and 114. The image forming apparatus 1 also includes an intermediate transfer belt 115 and a secondary transfer outer roller 116. The stations 111, 112, 113, and 114 respectively form toner images of yellow, magenta, cyan, and black on the intermediate transfer belt 115. The configurations of the stations 111, 112, 113, and 114 are the same as each other, except that the colors of toner are different from each other. The toner images formed by the stations 111, 112, 113, and 114 are transferred onto the intermediate transfer belt 115. The secondary transfer outer roller 116 transfers the toner image formed on the intermediate transfer belt 115, onto the sheet P conveyed from the sheet cassette 105. The fixing apparatus 107 fixes the toner image transferred onto the sheet P, to the sheet P by applying heat and pressure to sheet P The sheet P to which the toner image has been fixed is discharged to a discharging tray 119.

Image Reading Apparatus

Figure 2:
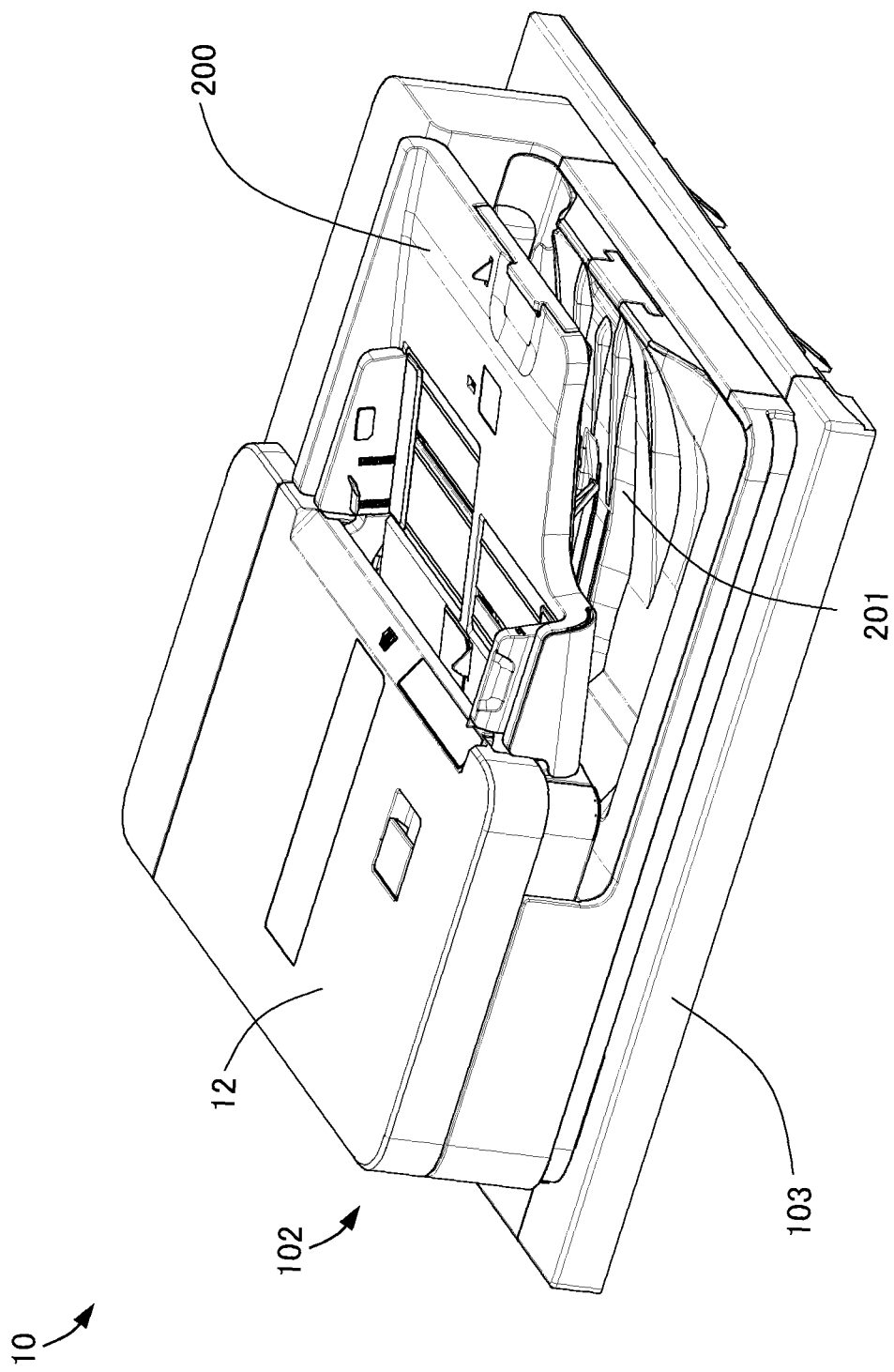
FIG. 2 is a perspective view illustrating an image reading apparatus of the present embodiment.
Figure 3:
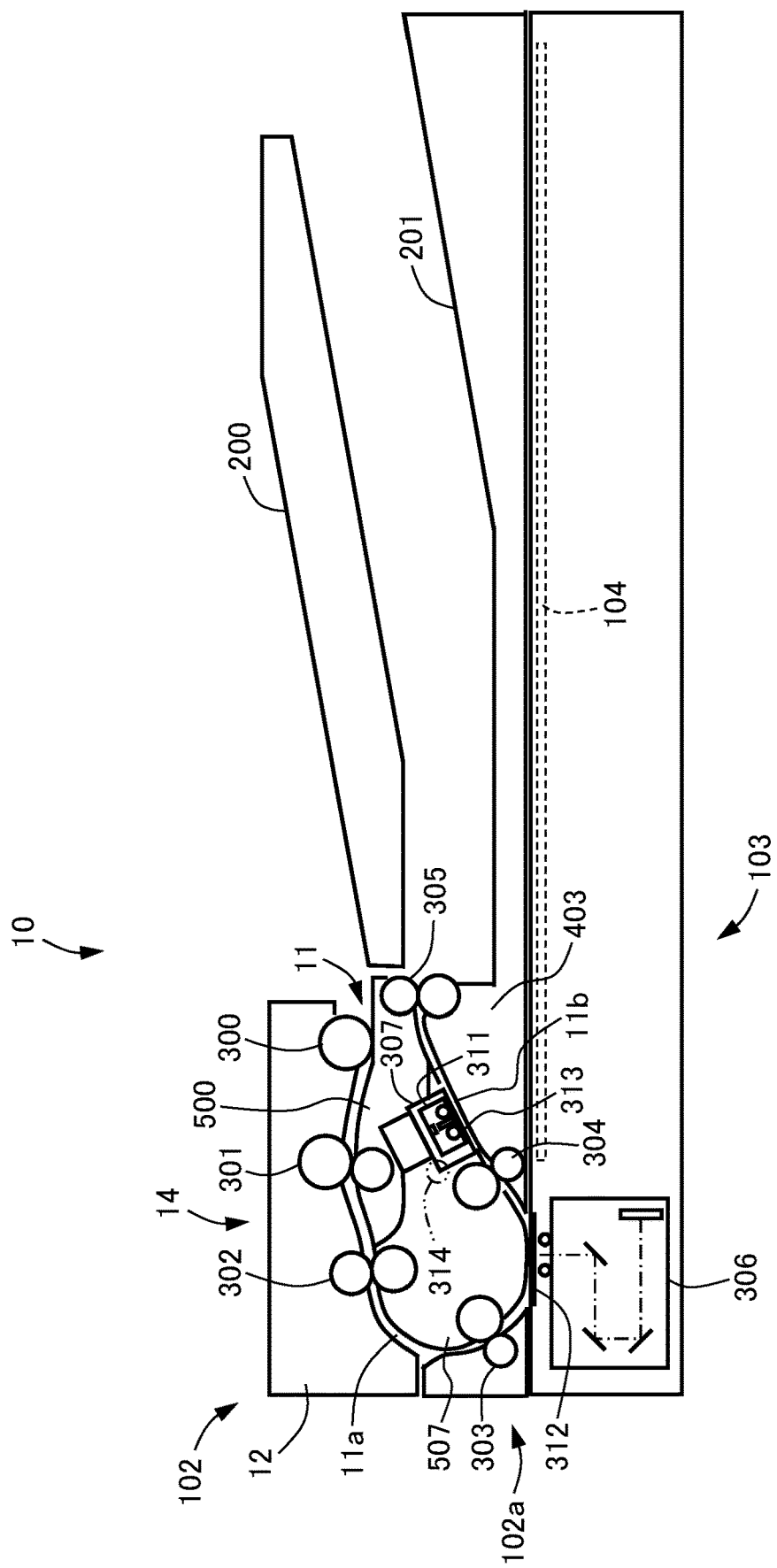
FIG. 3 is a cross-sectional view illustrating the image reading apparatus of the present embodiment.

FIG. 2 is a perspective view illustrating the image reading apparatus 10. As illustrated in FIG. 2, the image reading apparatus 10 includes a reader 103 and an auto document feeder (ADF) 102, which are disposed above the image forming apparatus body 2. The reader 103 reads the image of a document that is set by a user. FIG. 3 is a cross-sectional view illustrating the image reading apparatus 10. As illustrated in FIG. 3, the ADF 102 conveys a plurality of documents that is set on a document tray 200, into the interior of the image reading apparatus 10, so that a first reading unit 306 and a second reading unit 307, which are disposed in the image reading apparatus 10, can read the image of the document. Specifically, the document placed on the document tray 200 is conveyed along a conveyance path 11 by a conveyance portion 14. The conveyance portion 14 includes a feeding roller 300, a conveyance roller 301, a conveyance roller 302, a conveyance roller 303, a conveyance roller 304, a discharging roller 305, and a guide member. The guide member forms the conveyance path 11.

The image information of a first side of the document is read, via a first document-feeding-reading glass 312, by the first reading unit 306 disposed in the reader 103. The document is further conveyed by the conveyance roller 304, and the image information of a second side of the document, opposite to the first side, is read, via a second document-feeding-reading glass 313, by the second reading unit 307 disposed in the ADF 102. The second reading unit 307 reads the image of a document in a position in which the second reading unit 307 is fixed with respect to the conveyance portion 14 relatively. After the image of the document is read, the document is discharged to a discharging tray 201 by the discharging roller 305. In addition, the reader 103 includes a document platen glass 104, and a document can be placed on the document platen glass 104 by opening and closing the ADF 102. In this case, the reader 103 can read the image of the document by moving the first reading unit 306 in a sub-scanning direction and causing the first reading unit 306 to scan the document.

Figure 5:
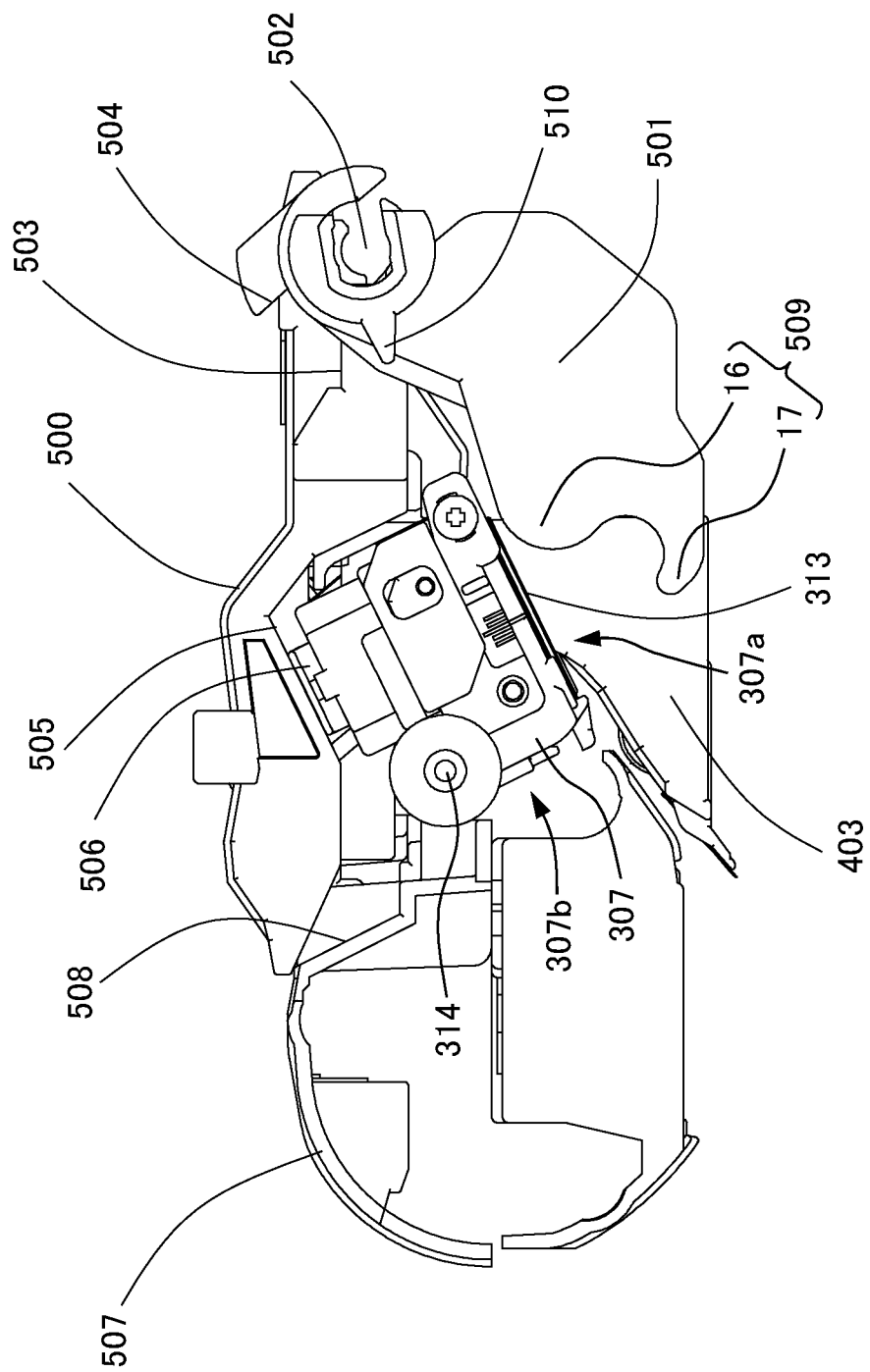
FIG. 5 is a front view illustrating a state where the second reading unit and a separation guide member of the present embodiment are located in closed positions.

In the present embodiment, the ADF 102 includes a main-body unit 102a that is one example of a support portion, an outer cover 12 that is one example of a second cover, a separation guide member 500, and the second reading unit 307. The main-body unit 102a includes a conveyance guide member 507, a reading-guide member 403, and a frame such as a below-described front side-plate 1900. In the main-body unit 102a, the conveyance path 11 is formed. As illustrated in FIG. 2, the outer cover 12 forms a top face of the ADF 102. The outer cover 12 is disposed so as to be able to pivot or rotate with respect to the main-body unit 102a, and can move between a third closed position in which the outer cover 12 is closed and a third open position in which the outer cover 12 is opened. In the third closed position, the outer cover 12, together with the separation guide member 500, forms an upper conveyance path 11a of the conveyance path 11. The upper conveyance path 11a is one example of a second area of the conveyance path 11. In the third open position, the outer cover 12 opens the upper conveyance path 11a. In the present embodiment, in the third closed position, the outer cover 12 forms the upper conveyance path 11a between the outer cover 12 and both the conveyance guide member 507 and the separation guide member 500. That is, the outer cover 12 can move between the third closed position in which the outer cover 12 is closed and the third open position in which the outer cover 12 is opened. In the third closed position, the outer cover 12 forms the upper conveyance path 11a of the conveyance path 11, formed between the outer cover 12 and the separation guide member 500 when the separation guide member 500 is located or located in a second closed position (FIG. 5). In the third open position, the outer cover 12 opens the upper conveyance path 11a. The bottom face of the outer cover 12 faces the upper surface of a document that is conveyed, and the top face of the separation guide member 500 faces the lower surface of a document that is conveyed. Here, the third closed position is a position in which the outer cover 12 forms the upper conveyance path 11a of the conveyance path 11 other than a lower conveyance path 11b together with the separation guide member 500 located in the second closed position.

The conveyance guide member 507 guides a document in a position positioned downstream of the separation guide member 500. The reading-guide member 403 is disposed opposite to the separation guide member 500 with respect to the second reading unit 307, and forms a lower conveyance path 11b between the reading-guide member 403 and the second reading unit 307. The lower conveyance path 11b is a portion of the conveyance path 11, and is continuous with the upper conveyance path 11a and disposed downstream of the upper conveyance path 11a. That is, the reading-guide member 403 forms one surface of the lower conveyance path 11b of the conveyance path 11. The lower conveyance path 11b is one example of a first area of the conveyance path 11, which is different from the upper conveyance path 11a of the conveyance path 11. The second reading unit 307 is disposed between the upper conveyance path 11a and the lower conveyance path 11b in the vertical direction. The upper conveyance path 11a and the lower conveyance path 11b constitute the conveyance path 11, which is curved and substantially U-shaped.

Second Reading Unit

Figure 4:
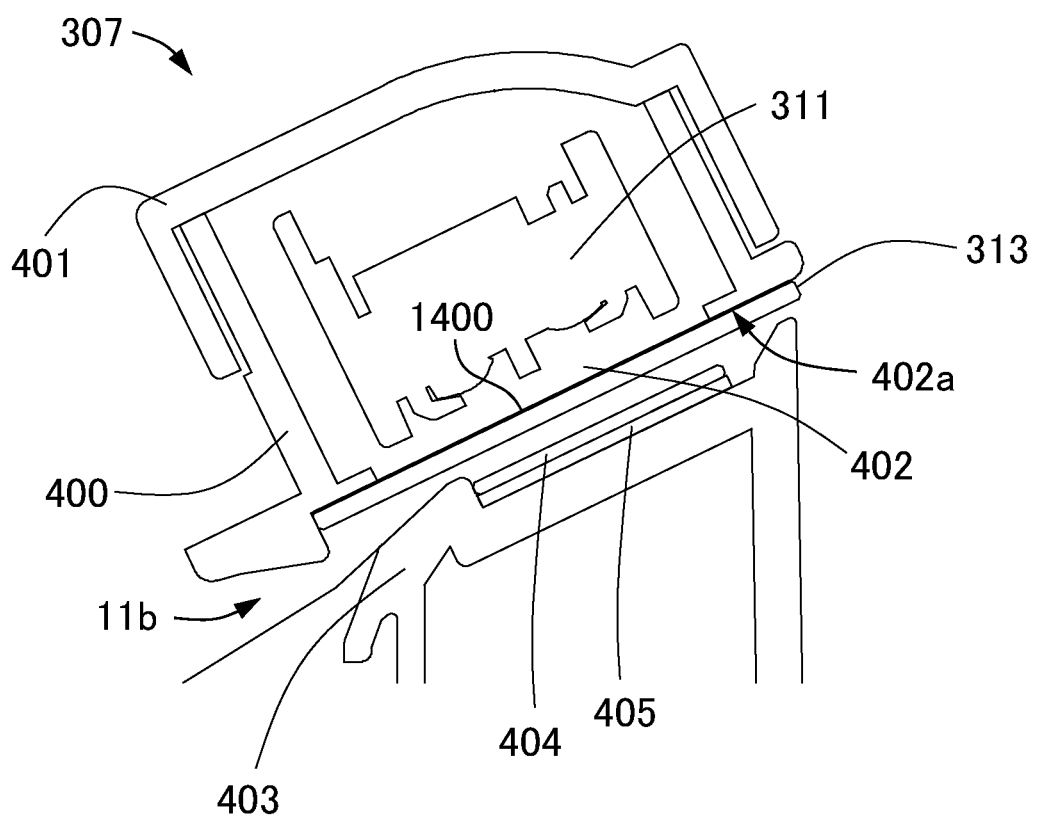
FIG. 4 is a cross-sectional view of a second reading unit of the present embodiment.

FIG. 4 is a cross-sectional view of the second reading unit 307. The second reading unit 307 is one example of a reading portion and a second reading portion. As illustrated in FIG. 4, the second reading unit 307 includes a first casing member 400 and a second casing member 401 that are one example of a casing, a CIS 311 that is a contact image sensor, and the second document-feeding-reading glass 313. The second reading unit 307 moves relative to the conveyance guide member 507 (see FIGS. 5 to 8) by pivoting and linearly moving with respect to the conveyance guide member 507. Note that although the second reading unit 307 pivots and linearly moves with respect to the conveyance guide member 507 in the present embodiment, the present disclosure is not limited to this. For example, the second reading unit 307 may simply pivot with respect to the conveyance guide member 507, may simply move linearly with respect to the conveyance guide member 507, or may perform other relative movement with respect to the conveyance guide member 507. The CIS 311 is one example of an image sensor (reading element) that reads the image of a document, and is housed by the first casing member 400 and the second casing member 401. The CIS 311 is connected to a below-described FFC 9, and reads the image of a sheet conveyed along the lower conveyance path 11b of the conveyance path 11.

The second reading unit 307 is disposed so as to be able to pivot with respect to the conveyance guide member 507, which is disposed in the main-body unit 102a. The second reading unit 307 can move between a first closed position in which the second reading unit 307 is closed and a first open position in which the second reading unit 307 is opened. The second reading unit 307 forms the lower conveyance path 11b of the conveyance path 11 in the first closed position. In the first closed position, the second reading unit 307 forms the other surface of the lower conveyance path 11b. In the first open position, the second reading unit 307 opens the lower conveyance path 11b. The second reading unit 307 reads an image of a document conveyed in the lower conveyance path 11b. Note that the first closed position is a position in which the second reading unit 307 reads an image of a document. In addition, the first open position is a position in which the second document-feeding-reading glass 313 is exposed to the outside of the apparatus when viewed from above.

A portion of the first casing member 400 on aside of the conveyance path is provided with an opening portion 402 for reading the image information of a sheet conveyed. The opening portion 402 is one example of an opening portion. That is, the first casing member 400 includes an edge portion 402a that is one example of an opening-portion forming portion. The edge portion 402a forms the opening portion 402, through which the optical path of the CIS 311 extends toward the lower conveyance path 11b. That is, the first casing member 400 includes the opening portion 402 through which light passes to the CIS 311. The second document-feeding-reading glass 313 is stuck on the edge portion 402a so as to cover the opening portion 402. That is, the second document-feeding-reading glass 313 is one example of a transparent member, and covers the opening portion 402 when stuck on the first casing member 400. The reading-guide member 403 that serves as a conveyance guide member is disposed on the outer side of the second document-feeding-reading glass 313, that is, on the side of the conveyance path of the second document-feeding-reading glass 313. The reading-guide member 403 is provided with a white sheet 405 and a protective glass 404, disposed so as to face the CIS 311. The protective glass 404 protects the white sheet 405. The white sheet 405 is disposed for performing the shading compensation of the CIS 311 before the image information of a document is read. The protective glass 404 is disposed so that the surface of the white sheet 405 is not damaged (e.g., scratched) by a document conveyed.

Next, how the second reading unit 307 pivots in the ADF 102 of the present embodiment will be described with reference to FIGS. 5 to 8. FIGS. 5 to 8 are front views illustrating a configuration for pivoting the second reading unit 307 of the present embodiment. As illustrated in FIG. 5, in the interior of the ADF 102, the separation guide member 500, the conveyance guide member 507, and the reading-guide member 403 constitute the conveyance guide. The separation guide member 500 is one example of a first cover, and is a pivot guide member that constitutes half the conveyance guide on the feeding and separation portion side. That is, the separation guide member 500 is disposed so as to be able to pivot with respect to the conveyance guide member 507 disposed in the main-body unit 102a. The separation guide member 500 is disposed closer to the upper conveyance path 11a than the second reading unit 307 is. That is, the separation guide member 500 is disposed opposite to the lower conveyance path 11b. The separation guide member 500 can move between a second closed position (FIG. 5) in which the separation guide member 500 is closed and a second open position (FIG. 8) in which the separation guide member 500 is opened. In the second closed position, the separation guide member 500 covers the second reading unit 307 and an exposed portion 90; in the second open position, the separation guide member 500 opens the second reading unit 307 and the exposed portion 90. That is, the separation guide member 500 can move between the second closed position in which the separation guide member 500 is closed and the second open position in which the separation guide member 500 is opened. In the second closed position, the separation guide member 500 covers the second reading unit 307 located in the first closed position; in the second open position, the separation guide member 500 opens the second reading unit 307 such that the second reading unit 307 can be opened and closed. Note that as illustrated in FIG. 3, when the outer cover 12 is located in the third closed position, the outer cover 12 covers the upper portion of the separation guide member 500. Thus, if the outer cover 12 is opened until the outer cover 12 is located in the third open position, it becomes possible to pivot the separation guide member 500.

The conveyance guide member 507 constitutes half the conveyance guide that is bent. The reading-guide member 403 constitutes a portion of the conveyance guide that the second reading unit 307 faces. The separation guide member 500 is provided with the pivot shaft 502, and can be pivoted by a user for performing the jam handling or cleaning the second document-feeding-reading glass 313 disposed on the second reading unit 307 and the protective glass 404 disposed for the white sheet 405. Note that in the present embodiment, members necessary for describing the configuration of the present invention are mainly described schematically.

Next, a state where the second reading unit 307 and the separation guide member 500 are located in closed positions, as illustrated in FIG. 5, will be described. In this state, a pressing portion 505 formed in the separation guide member 500 pushes down a pressed portion 506 formed in the second reading unit 307, downward from above. Thus, the second document-feeding-reading glass 313 of the second reading unit 307 abuts against the reading-guide member 403 that faces the second document-feeding-reading glass 313, with a predetermined clearance being formed, so that the conveyance path is formed. Furthermore, a cam member 501 is disposed on the pivot shaft 502 of the separation guide member 500. The cam member 501 is separated from the second reading unit 307 when the separation guide member 500 is located in the second closed position. Since the cam member 501 is not in contact with the second reading unit 307, it is possible to keep the high positional accuracy of the second reading unit 307. In addition, the separation guide member 500 is provided with a first contact portion 503, and the cam member 501 is provided with a second contact portion 504 (see FIG. 20). That is, the separation guide member 500 includes the first contact portion 503 that is one example of a contacting portion, and the cam member 501 includes the second contact portion 504 that is one example of a contacted portion. The second contact portion 504 can pivot with respect to the separation guide member 500, and can be contacted with the first contact portion 503 in the pivot direction.

Figure 6:
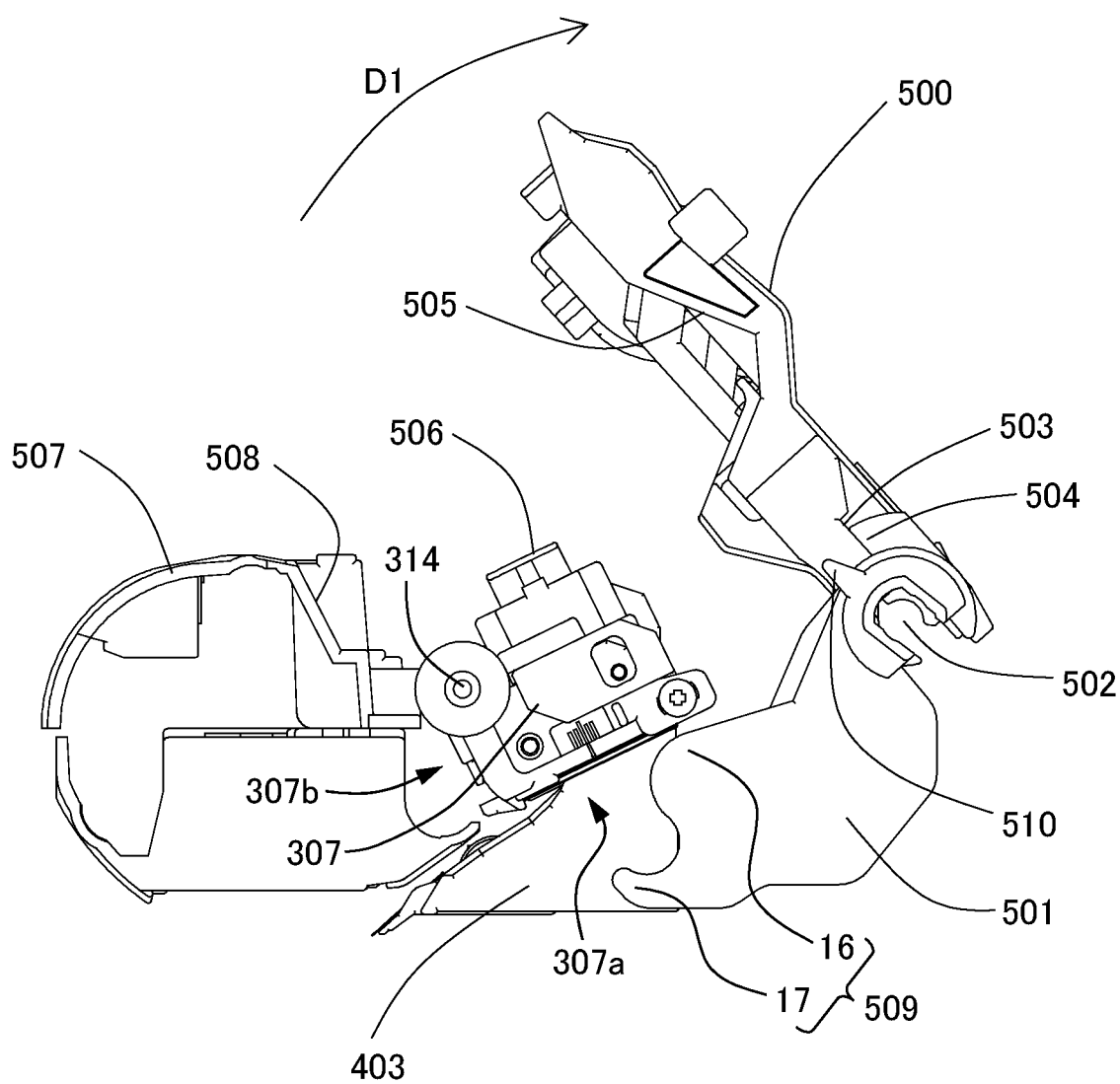
FIG. 6 is a front view illustrating a state where the separation guide member of the present embodiment has been pivoted.

FIG. 6 is a front view illustrating a state where the separation guide member 500 has been pivoted in a D1 direction. If the separation guide member 500 is pivoted by a predetermined angle or more, the cam member 501 also pivots in synchronization with the separation guide member 500 (see FIGS. 6 to 8). Furthermore, the separation guide member 500 is provided with a first projection portion 510. Thus, if the separation guide member 500 is pivoted by a predetermined angle or more, the first projection portion 510 abuts against a below-described second projection portion 1901, so that the pivoted state is kept. That is, when the separation guide member 500 pivots from the second closed position toward an intermediate position between the second closed position and the second open position, the first contact portion 503 does not lock on the second contact portion 504. However, if the separation guide member 500 passes the intermediate position and pivots from the intermediate position toward the second open position, the first contact portion 503 locks on the second contact portion 504, and the cam member 501 pivots in accordance with the movement of the separation guide member 500.

Figure 7:
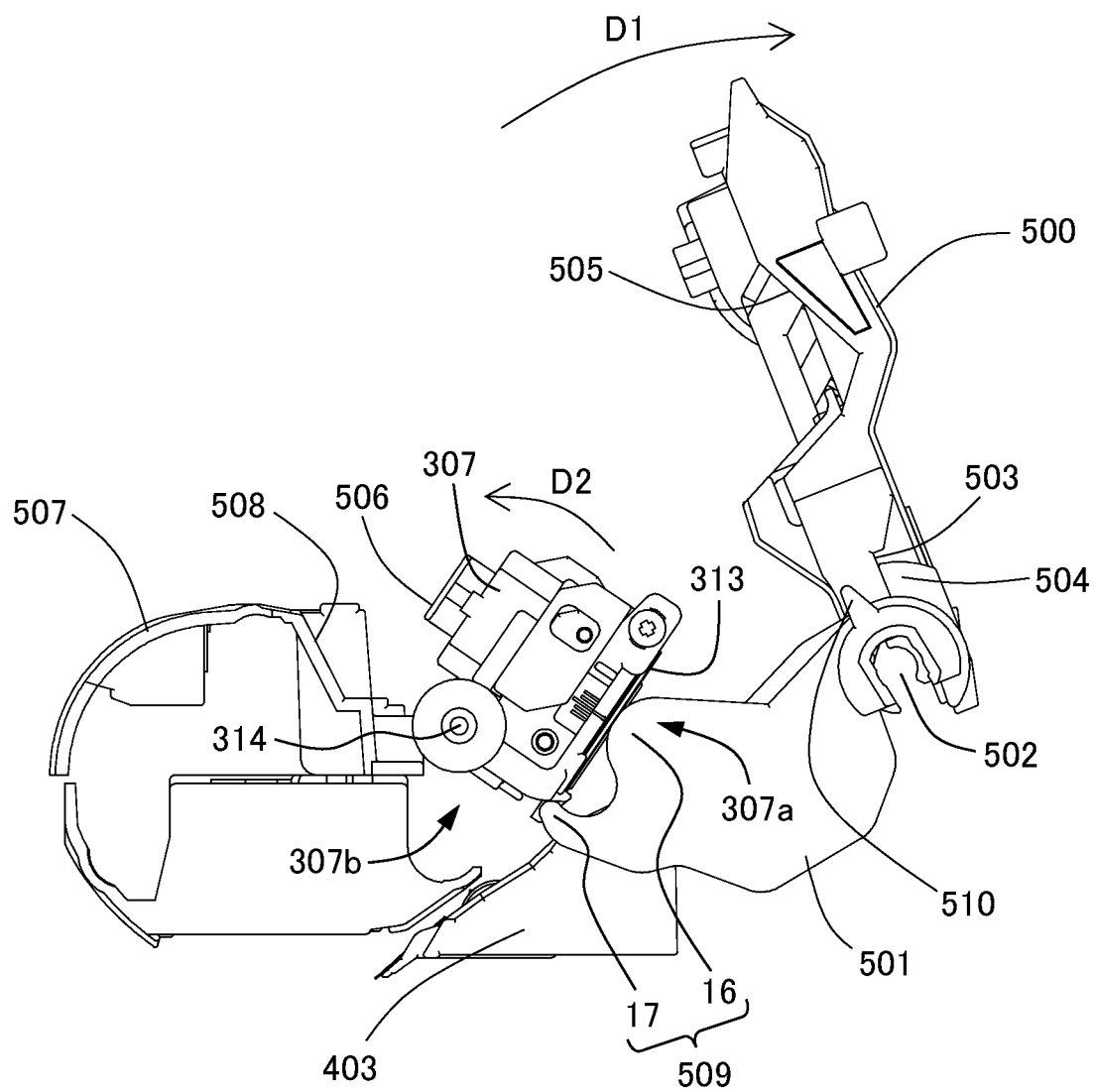
FIG. 7 is a front view illustrating a state where the separation guide member of the present embodiment is pushing up the second reading unit.

On the other hand, the second reading unit 307 is provided with the pivot shaft 314. FIG. 7 is a front view illustrating a state where the separation guide member 500 is pushing up the second reading unit 307 in a D2 direction via the cam member 501. As illustrated in FIG. 7, if the separation guide member 500 is pivoted by a predetermined angle or more, a cam portion 509 of the cam member 501, which pivots in synchronization with the separation guide member 500, abuts against the second reading unit 307. Thus, the second reading unit 307 starts to pivot on the pivot shaft 314 in the D2 direction, in synchronization with the pivot motion of the separation guide member 500.

The cam portion 509 includes a first abutment portion 16 and a second abutment portion 17. When the second reading unit 307 is located in the first closed position, the first abutment portion 16 abuts against a lower portion 307a of the second reading unit 307 and presses the second reading unit 307 upward. After the second reading unit 307 is pivoted by the first abutment portion 16, the second abutment portion 17 abuts against a side portion 307b, which is perpendicular to the lower portion 307a of the second reading unit 307, and presses the second reading unit 307 until the second reading unit 307 is located in the first open position. That is, the side portion 307b faces a direction other than a direction in which the lower portion 307a faces. Thus, in a simple configuration in which the single cam member 501 is used, the second reading unit 307 can be pushed up by about 90 degrees.

Figure 8:
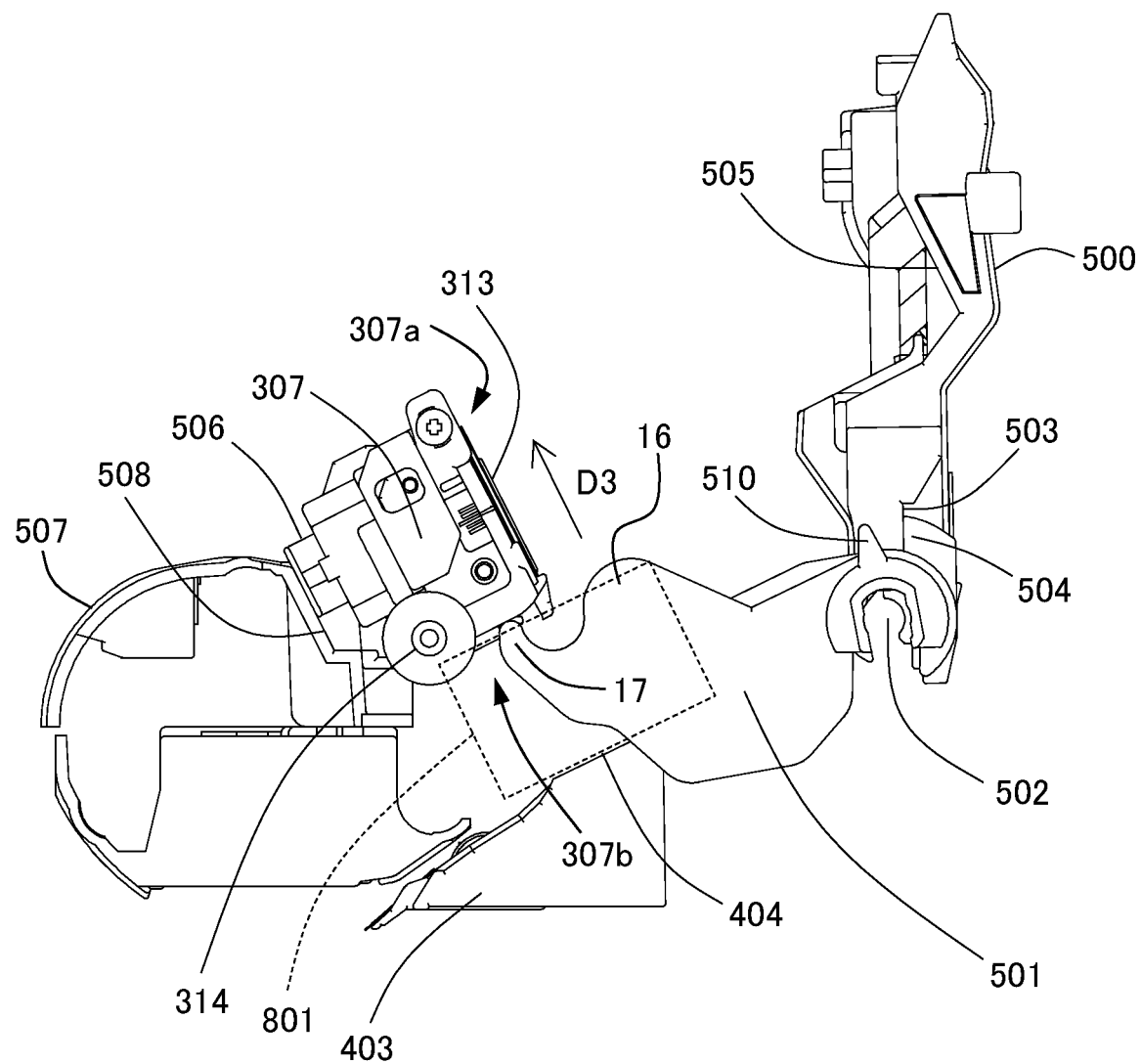
FIG. 8 is a front view illustrating a state where the second reading unit and the separation guide member of the present embodiment are located in open positions.

FIG. 8 is a front view illustrating a state where the second reading unit 307 and the separation guide member 500 are located in open positions. As illustrated in FIG. 8, if the second reading unit 307 is pivoted by a predetermined angle, a pressed portion 506 formed in the second reading unit 307 abuts against an angle regulation portion 508 formed in the conveyance guide member 507, so that the second reading unit 307 is prevented from pivoting. In addition, the second reading unit 307 that is prevented from pivoting is caused to slide in a D3 direction, by the cam member 501. That is, the cam member 501 is one example of an interlocking member; and when the separation guide member 500 is pivoted from the second closed position to the second open position, the cam member 501 moves in accordance with the movement of the separation guide member 500, and presses the second reading unit 307 in a direction in which the second reading unit 307 pivots from the first closed position to the first open position. That is, the cam member 501 is configured to move the second reading unit 307 from the first closed position to the first open position interlocked with movement of the separation guide member 500 from the second closed position to the second open position.

Figure 23:
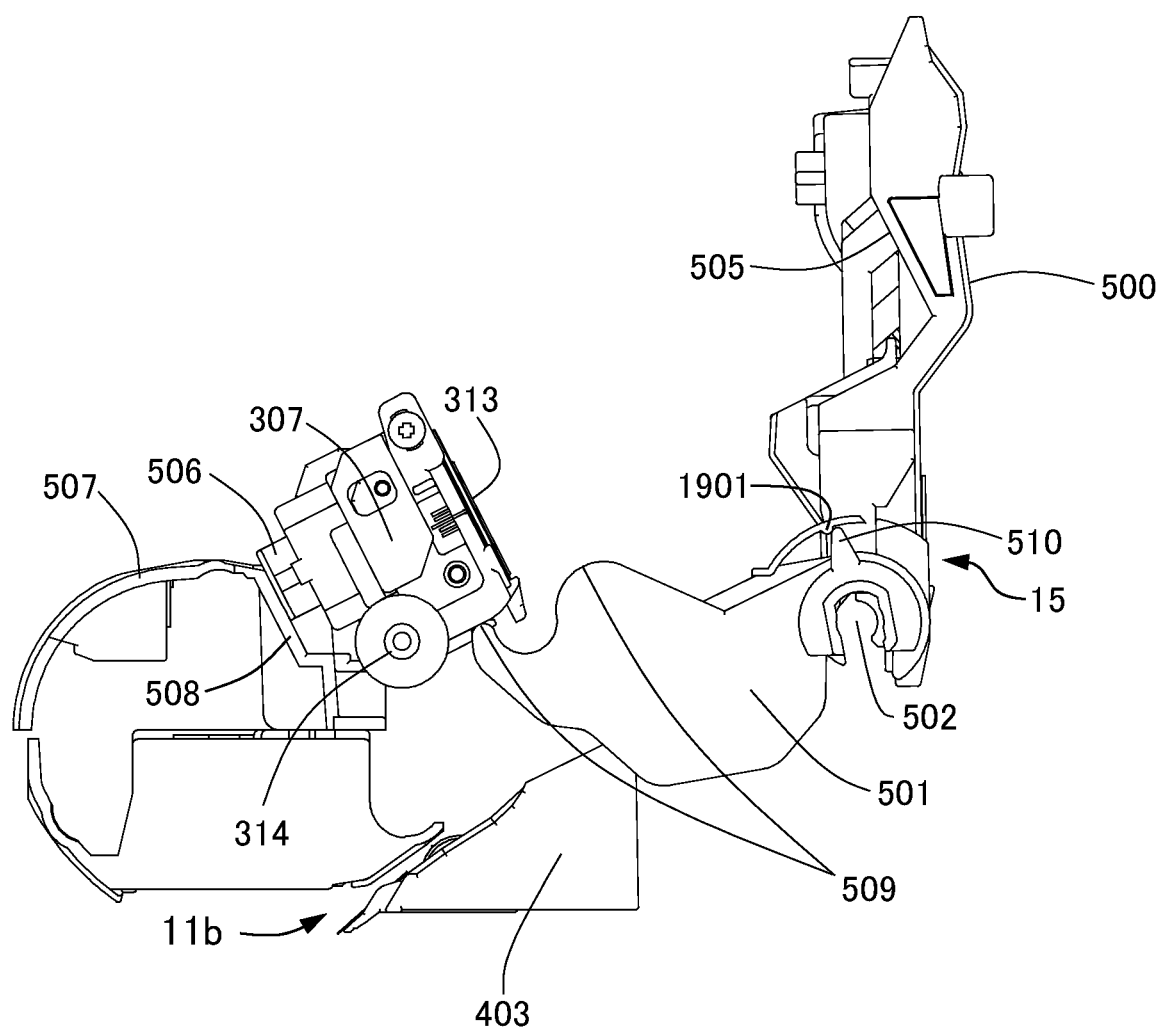
FIG. 23 is a front view illustrating the pivot regulation portion and the first projection portion of the present embodiment that are located in open positions.

In the state illustrated in FIG. 8, the pivoted state of the separation guide member 500 is finally kept by a holding mechanism 15 (see FIG. 23). In this state, the pivoted state of the second reading unit 307 is also kept by the separation guide member 500 whose pivoted state is kept. That is, in the state where the separation guide member 500 is prevented from moving from the second open position to the second closed position by the holding mechanism 15, the second reading unit 307 is held in the first open position by the cam member 501. On the other hand, when the state illustrated in FIG. 8 is changed back to the state illustrated in FIG. 5, the separation guide member 500 held by the holding mechanism 15 is released from the second open position, and pivots from the second open position to the second closed position. Thus, the second reading unit 307 pivots from the first open position to the first closed position due to the self-weight of the second reading unit 307.

When documents are being conveyed, a user was not able to access the second document-feeding-reading glass 313 and the protective glass 404 of the white sheet 405, as illustrated in FIG. 5. In the present embodiment, however, as illustrated in FIG. 8, a user can access both the second document-feeding-reading glass 313 and the protective glass 404 of the white sheet 405 by pivoting the second reading unit 307 and the separation guide member 500. In particular, since the second reading unit 307 slides, as illustrated in FIG. 8, in the D3 direction in the latter half of the pivot motion, it becomes possible to secure a cleaning space 801 for cleaning the protective glass 404 of the white sheet 405.

FFC

Figure 9:
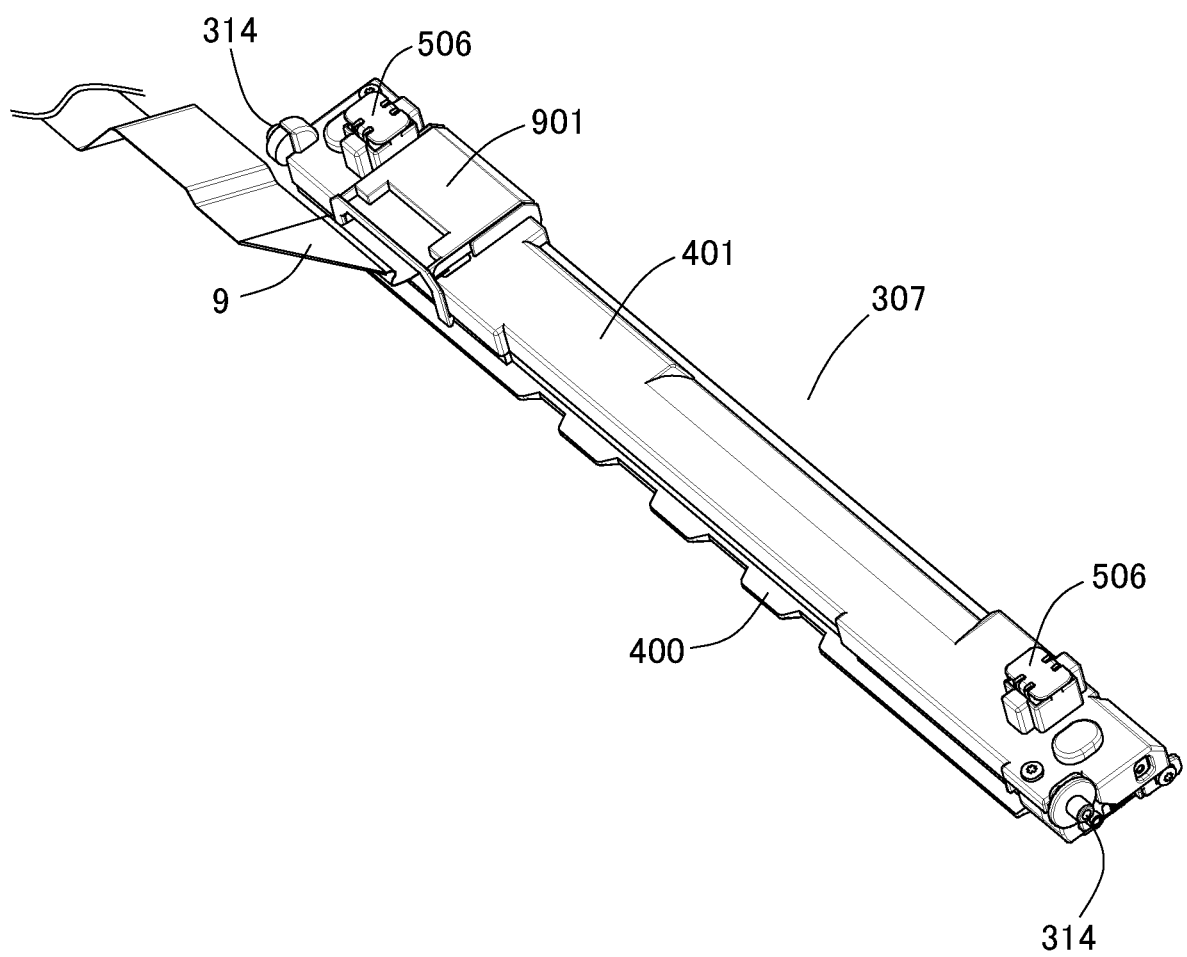
FIG. 9 is a perspective view illustrating the second reading unit and an FFC of the present embodiment.
Figure 10:
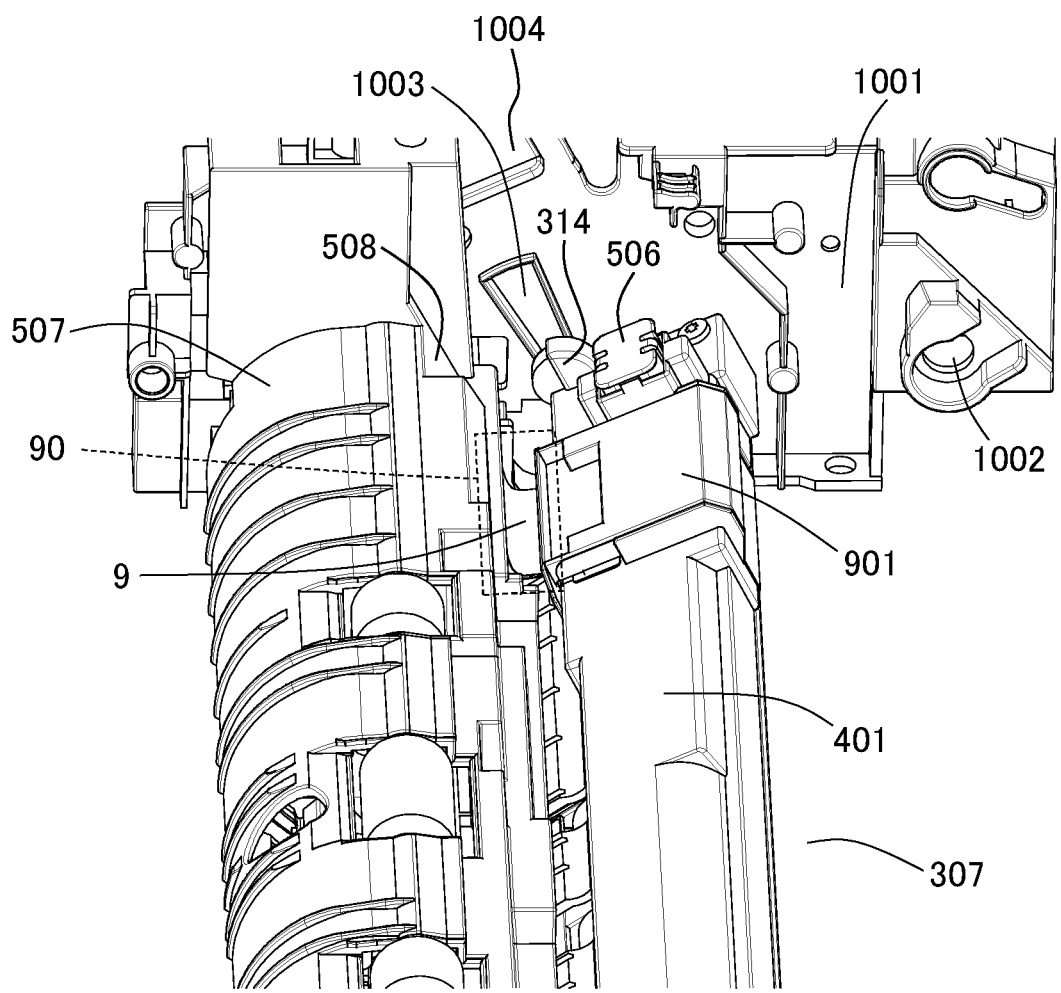
FIG. 10 is a perspective view illustrating a position of an exposed portion, positioned in an ADF of the present embodiment.
Figure 11:
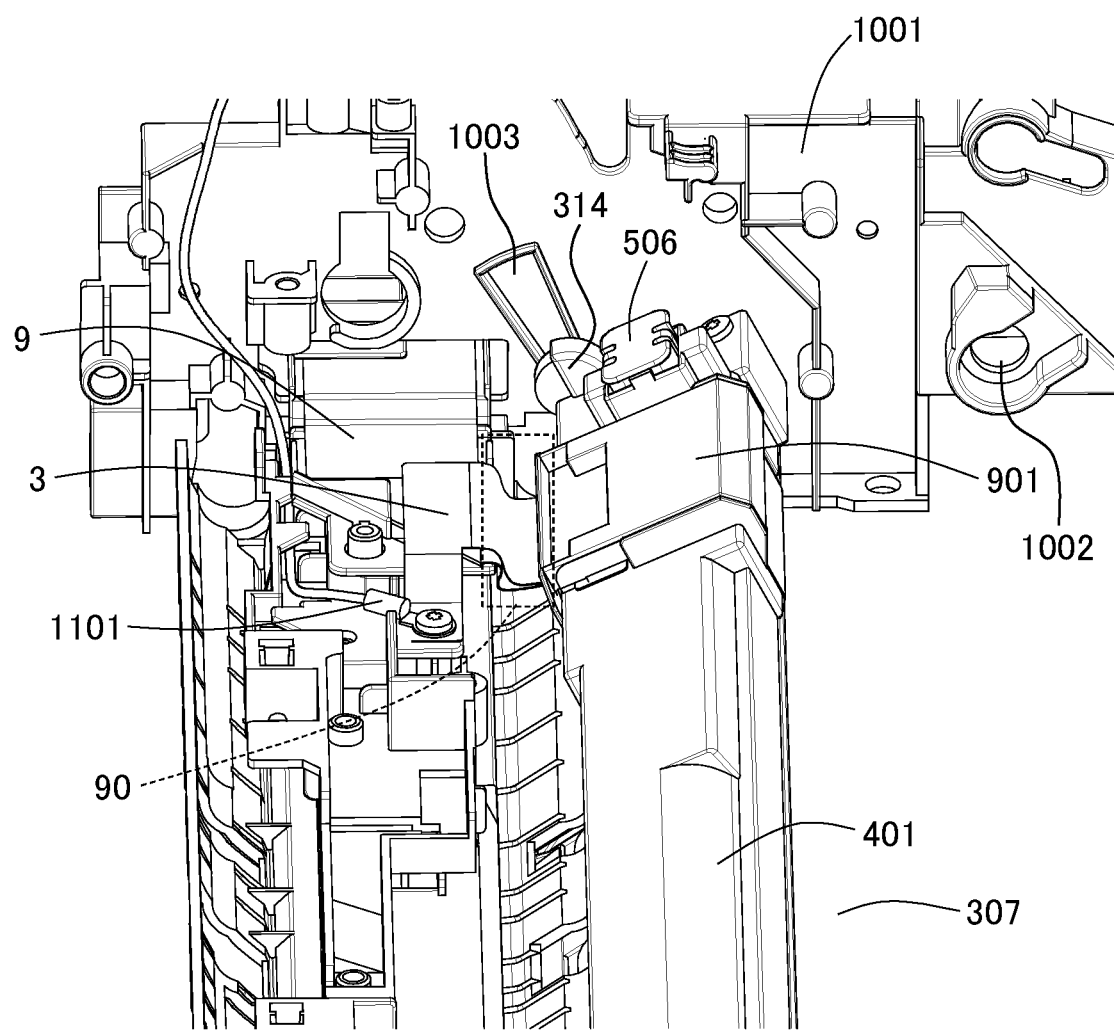
FIG. 11 is a perspective view illustrating arrangement of an FFC earth sheet, positioned in the ADF of the present embodiment.
Figure 12:
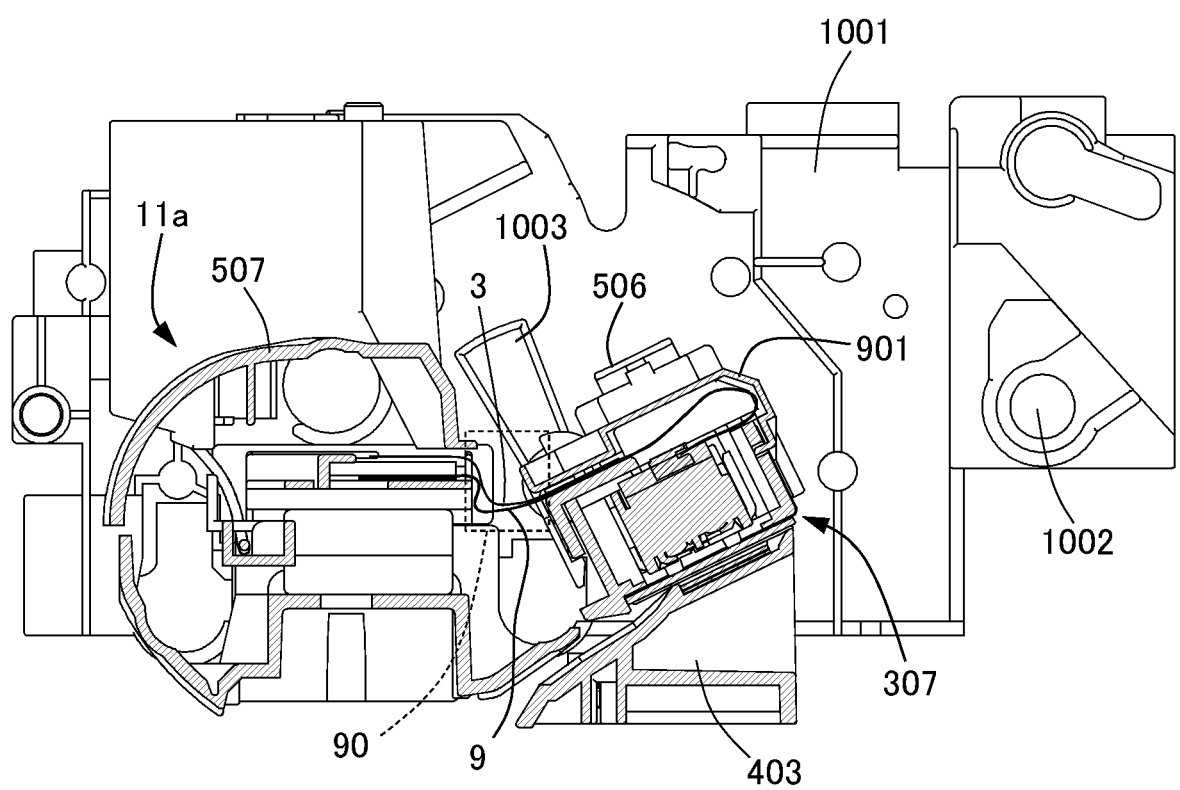
FIG. 12 is a cross-sectional view illustrating the arrangement of the FFC earth sheet of the present embodiment.

Next, a configuration of the FFC 9, which is connected to the second reading unit 307, will be described with reference to FIGS. 9 to 13. FIG. 9 is a perspective view illustrating a positional relationship between the second reading unit 307 and the FFC 9. FIGS. 10 to 12 are diagrams illustrating the position of the exposed portion 90 of the FFC 9, and the arrangement of an FFC earth sheet 3 that serves as a conductive sheet member.

As illustrated in FIG. 9, the FFC 9, which is one example of a flexible cable, is connected to the CIS 311 disposed in the second reading unit 307; and an FFC cover member 901 covers the connection portion of the FFC 9 so as to conceal the connection portion. As illustrated in FIG. 10, since the second reading unit 307 is configured so as to be able to pivot in the ADF 102, a portion of the FFC 9, which serves as the exposed portion 90, is exposed to the outside of the apparatus, when viewed from above, in a state where both the outer cover 12 and the separation guide member 500 are opened. That is, the exposed portion 90 of the FFC 9 bridges a space between the conveyance guide member 507 and the second reading unit 307, and the FFC 9 transmits an electric signal (i.e., an image signal). The exposed portion 90 is one example of a bridging portion. The exposed portion 90 is located between the main-body unit 102a and the second reading unit 307, and exposes to an outside of the main-body unit 102a and the second reading unit 307. However, if the portion of the FFC 9 is exposed to the outside of the apparatus, the static electricity may fly from fingertips of a user to the exposed portion of the FFC 9 when the user performs work, and may cause the failure of an electric component. Note that the exposed portion 90 is a portion of the FFC 9 that is exposed to the outside in the clearance between the conveyance guide member 507 fixed to the main-body unit 102a and the second reading unit 307, in a state where the outer cover 12 is located in the third open position and the separation guide member 500 is located in the second open position.

In the present embodiment, as illustrated in FIG. 11, the FFC earth sheet 3 that is a conductive sheet member is disposed so as to cover the exposed portion 90 from above. That is, the FFC earth sheet 3 covers a surface of the portion of the FFC 9 that is exposed to a user side. In addition, one end of the FFC earth sheet 3 is electrically grounded, via an earth wire 1101. That is, the FFC earth sheet 3 is one example of a shield member that has conductivity, and that is grounded. The FFC earth sheet 3 is disposed closer to the upper conveyance path 11a than the exposed portion 90 is. The FFC earth sheet 3 has conductivity and is grounded, so that the FFC earth sheet 3 discharges the static electricity, which is applied from the outside to the exposed portion 90, to the ground. The width of the FFC earth sheet 3 is substantially equal to the width of the FFC 9. However, the present disclosure is not limited to this. That is, the width of the FFC earth sheet 3 may be larger or smaller than the width of the FFC 9.

FIG. 12 is a cross-sectional view of the ADF 102 viewed from the front side of the ADF 102, and illustrates the arrangement of the FFC earth sheet 3. In the present embodiment, since a user accesses the components from above, the FFC earth sheet 3 is disposed so as to cover the upper side of the exposed portion 90 of the FFC 9.

Since the second reading unit 307 pivots as illustrated in FIGS. 5 to 8, the exposed portion 90 of the FFC 9 and a portion of the FFC earth sheet 3 that corresponds to the exposed portion 90 will be both bent an expected number of times of pivot motion of the second reading unit 307. Thus, it is necessary that the FFC earth sheet 3 be made of a material that can endure the expected number of bendings. In the present embodiment, the FFC earth sheet 3 is made of a metal-foil composite film. The metal-foil composite film is a composite material in which an aluminum foil is laminated on a PET base material made of polyester film. That is, the FFC earth sheet 3 is a film in which a metal layer and a polyester layer are laminated on each other.

Preferably, the FFC earth sheet 3 is disposed such that the aluminum-foil surface faces a direction from which the static electricity flies to the FFC 9, and that the PET base material faces the FFC 9. Specifically, in the present embodiment, the aluminum-foil surface is disposed above the FFC 9 in FIG. 12. That is, in the present embodiment, the FFC earth sheet 3 is disposed such that the polyester layer is closer to the FFC 9 than the metal layer is. With this arrangement, the FFC earth sheet 3 shields the FFC 9 against the static electricity while making the durability against bending higher than that of an FFC earth sheet 3 that is a simple aluminum sheet.

Figure 13:
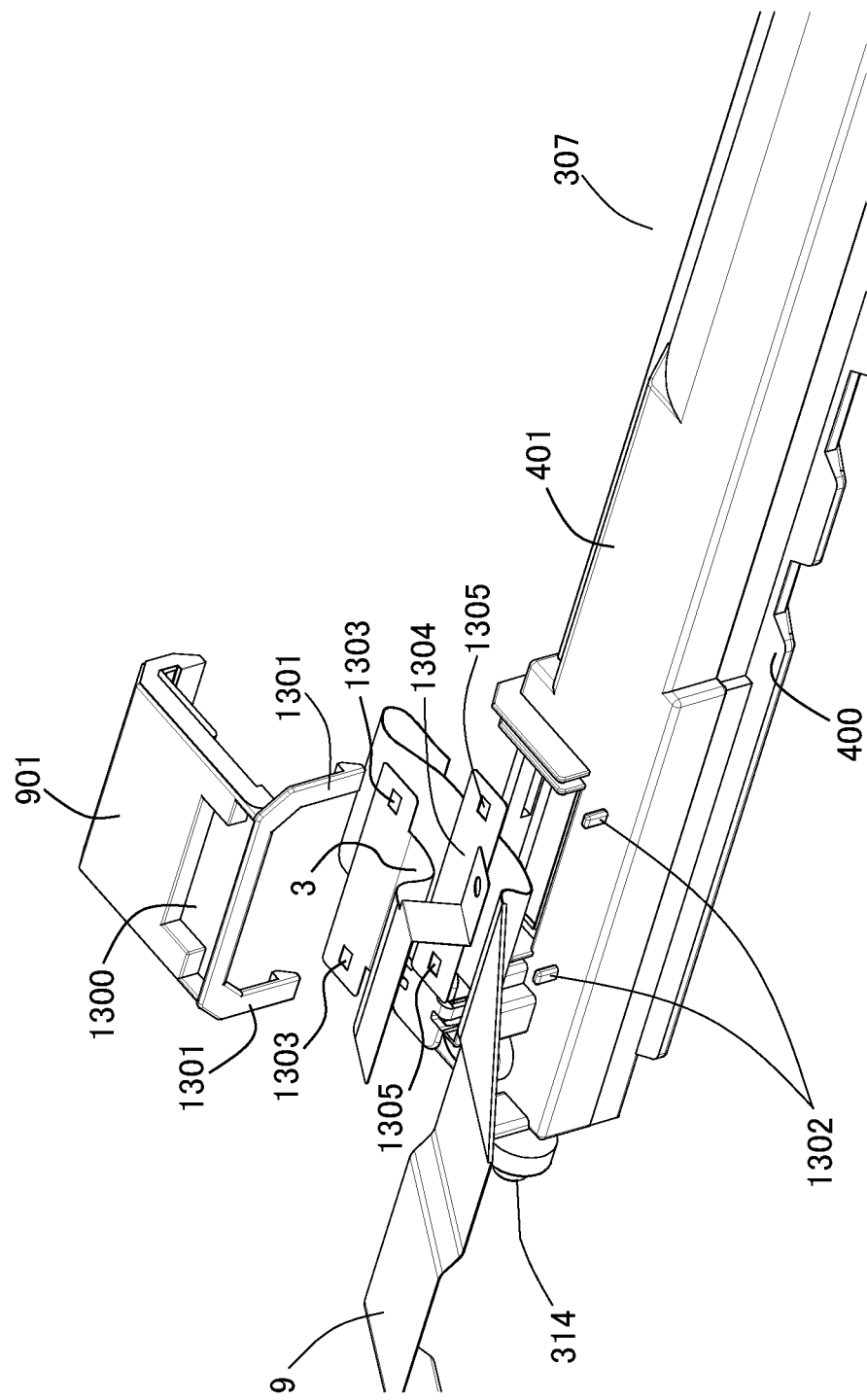
FIG. 13 is a perspective view illustrating the arrangement of the FFC earth sheet of the present embodiment, positioned in the second reading unit.

FIG. 13 illustrates a state where the FFC cover member 901, provided to the second reading unit 307, is removed from the second reading unit 307. With reference to FIG. 13, how the FFC earth sheet 3 is disposed in the second reading unit 307 will be described. FIG. 13 is a diagram illustrating the arrangement of the FFC earth sheet 3 disposed in the second reading unit 307. The second casing member 401, which constitutes the second reading unit 307, is provided with positioning projections 1302. The positioning projections 1302 are positioned at positions that correspond to the positions of positioning hole portions 1305 of an FFC positioning sheet 1304, and to the positions of positioning hole portions 1303 of the FFC earth sheet 3. The FFC positioning sheet 1304 is stuck on the FFC 9 for positioning the FFC 9. In the present embodiment, for preventing the FFC 9 and the FFC earth sheet 3 from becoming oblique in the pivot motion of the second reading unit 307, two positioning projections 1302 are disposed, separated from each other in the width direction. For the same reason, two positioning hole portions 1303 are disposed, separated from each other in the width direction; and two positioning hole portions 1305 are disposed, separated from each other in the width direction.

The FFC 9 is fixed to the second reading unit 307 by inserting (fitting) the positioning hole portions 1305 of the FFC positioning sheet 1304 in the positioning projections 1302. After the FFC 9 is fixed to the second reading unit 307, the positioning hole portions 1303 of the FFC earth sheet 3 are fit, from above, to the positioning projections 1302 for covering the upper side of the FFC 9 with the FFC earth sheet 3.

The FFC cover member 901 that serves as a fixing member is provided with an FFC fixing surface 1300. The FFC 9 and the FFC earth sheet 3 are nipped and fixed by the FFC fixing surface 1300 of the FFC cover member 901 and the top surface of the second casing member 401. In this configuration, the FFC 9 and the FFC earth sheet 3 are positioned and fixed in the second reading unit 307.

Second Document-Feeding-Reading Glass

Figure 14:
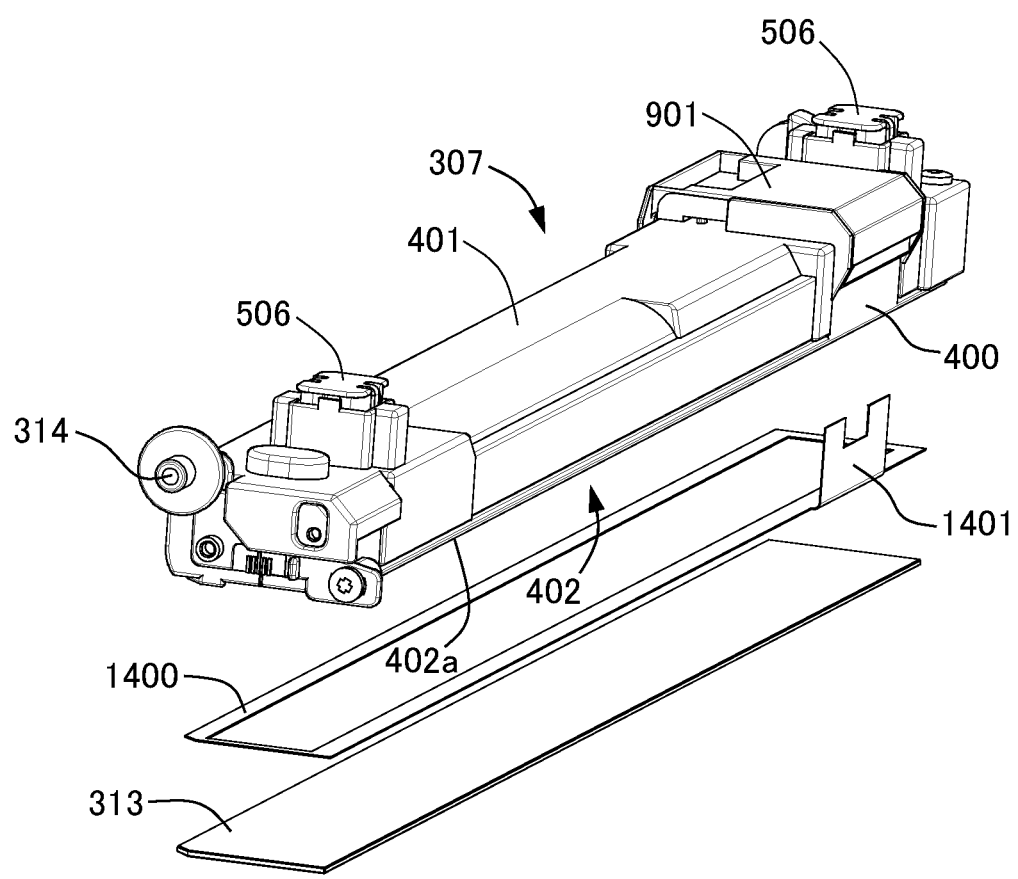
FIG. 14 is an exploded perspective view illustrating the second reading unit of the present embodiment.
Figure 15:
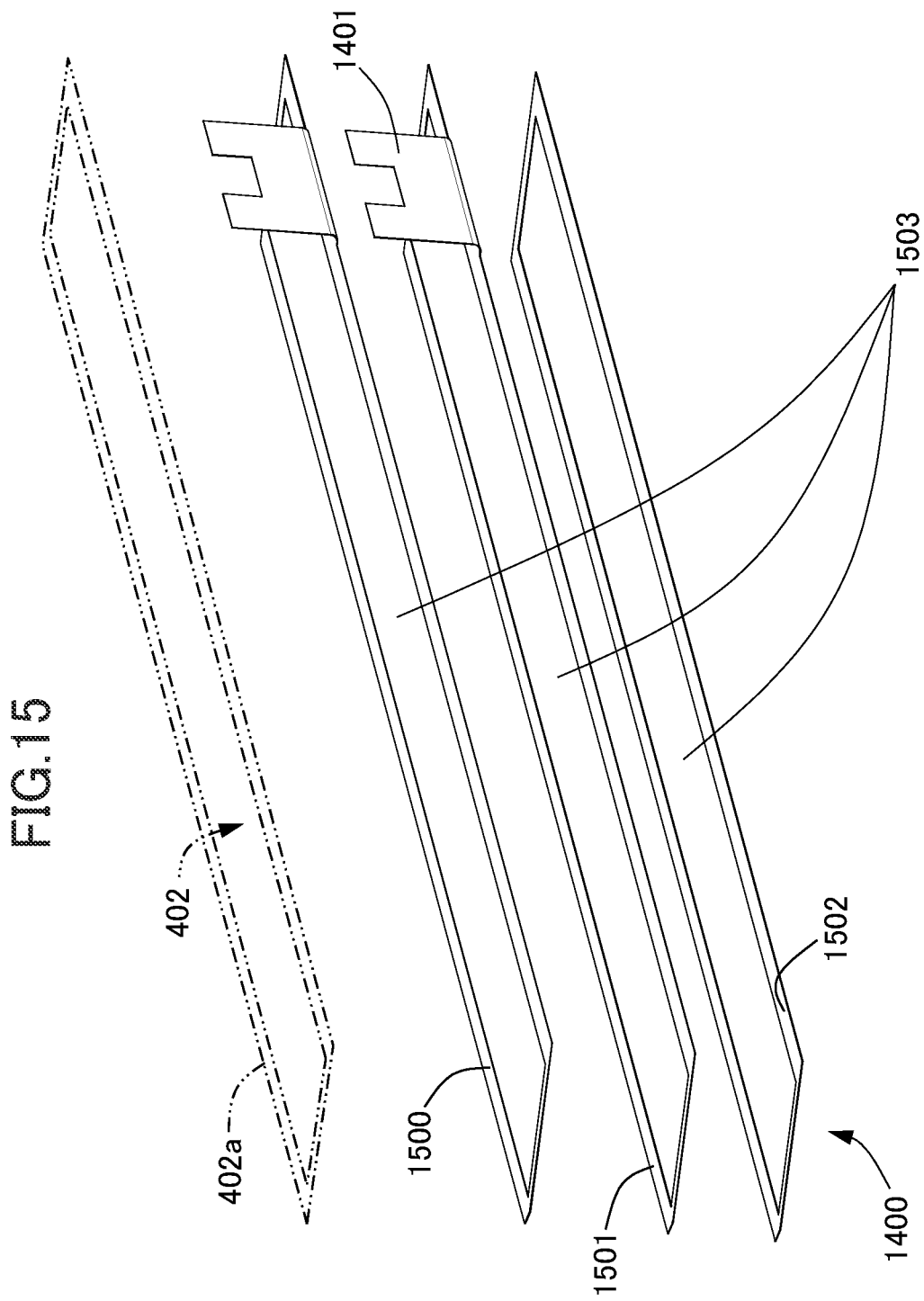
FIG. 15 is an exploded perspective view illustrating a glass earth sheet of the present embodiment.

Next, a configuration for fixing the second document-feeding-reading glass 313, disposed in the second reading unit 307, will be described with reference to FIGS. 14 to 17. FIGS. 14 to 17 are diagrams illustrating configurations of a glass earth sheet 1400 disposed on a portion of the second document-feeding-reading glass 313 of the present embodiment. As illustrated in FIGS. 14 and 15, the second document-feeding-reading glass 313 is stuck on the first casing member 400, which constitutes the second reading unit 307, via the glass earth sheet 1400 such that the glass earth sheet 1400 does not cover the opening portion 402 of the first casing member 400. Thus, the glass earth sheet 1400 has a shape that does not cover the opening portion 402. The glass earth sheet 1400 is one example of a shield member. In addition, the glass earth sheet 1400 is stuck on the second document-feeding-reading glass 313, while having conductivity and grounded. In the present embodiment, the glass earth sheet 1400 is disposed between the first casing member 400 and the second document-feeding-reading glass 313.

The glass earth sheet 1400 is a conductive sheet member having adhesiveness. The glass earth sheet 1400 may be a double-sided conductive tape, or may be a member in which an aluminum-foil tape and a double-sided tape are combined with each other. The aluminum-foil tape has an adhesive layer on one side. In the present embodiment, both sides of the glass earth sheet 1400 are adhesive, so that the second document-feeding-reading glass 313 is stuck on the first casing member 400 via the glass earth sheet 1400. That is, the glass earth sheet 1400 fixes the second document-feeding-reading glass 313 on the first casing member 400 by pasting. In another case, as illustrated in FIG. 15, the glass earth sheet 1400 may include a first sticking portion 1500 that serves as a double-sided tape, a conductive sheet member 1501, and a second sticking portion 1502 that serves as a double-sided tape. In this case, the conductive sheet member 1501 may be stuck on the first sticking portion 1500, and the second sticking portion 1502 may be stuck on the conductive sheet member 1501. In another case, both sides of the conductive sheet member may be applied with adhesive, and the second document-feeding-reading glass 313 may be stuck on the first casing member 400 via the conductive sheet member 1501. In another case, the conductive sheet member 1501 may be directly sandwiched between the second document-feeding-reading glass 313 and the first casing member 400. In this case, the second document-feeding-reading glass 313 may be fixed to the first casing member 400 via a hook portion formed in the first casing member 400, or via screws.

The glass earth sheet 1400 includes an electrical-connection portion 1401 that serves as an electrical contact, for electrically grounding the glass earth sheet 1400, via the FFC cover member 901, as described below. That is, in the configuration illustrated in FIG. 15, the first sticking portion 1500 is disposed for bonding the first casing member 400 and the conductive sheet member 1501. Thus, the first sticking portion 1500 and the conductive sheet member 1501 have an identical shape, and the electrical-connection portion 1401 of the conductive sheet member 1501, as well as the other portion of the conductive sheet member 1501 can be stuck on the first casing member 400. Unlike the first sticking portion 1500, the second sticking portion 1502 does not have a shape that corresponds to the shape of the electrical-connection portion 1401 of the conductive sheet member 1501. This is because the second sticking portion 1502 has only to be used for sticking the second document-feeding-reading glass 313 on the conductive sheet member 1501.

In the present embodiment, the conductive sheet member 1501 is made of the above-described metal-foil composite film. That is, the metal-foil composite film that serves as the conductive sheet member 1501 is a composite material in which an aluminum foil is laminated on a PET base material made of polyester film. Thus, the conductive sheet member 1501 is a film in which the metal layer and the polyester layer are laminated on each other. The reason is that since the glass earth sheet 1400 has a shape 1503 that does not cover the opening portion 402, the glass earth sheet 1400 is required to have a certain level of hardness for sticking the glass earth sheet 1400 on the first casing member 400. If the glass earth sheet 1400 does not have the certain level of hardness, it will become difficult to stick the glass earth sheet 1400 on the first casing member 400. However, if it is ensured by using a jig or the like that the glass earth sheet 1400 can be stuck on the first casing member 400, a simple metal foil may be used instead of the metal-foil composite film.

Note that if the glass earth sheet 1400 is not disposed, a problem as described below may occur. That is, when a user performs work, such as the jam handling or the cleaning work for the second document-feeding-reading glass 313, in the vicinity of the second document-feeding-reading glass 313, static electricity mayfly from fingertips of the user into the second reading unit 307 through a slight gap between the second document-feeding-reading glass 313 and the first casing member 400. Similarly, static electricity may fly from a document that is being conveyed, into the second reading unit 307 through a slight gap between the second document-feeding-reading glass 313 and the first casing member 400. Ifthe static electricity enters the second reading unit 307 through the slight gap between the second document-feeding-reading glass 313 and the first casing member 400, the static electricity may flow to an electric component, such as an LED element disposed in the CIS 311; and may cause the failure of the electric component. Conventionally, the second document-feeding-reading glass 313 is stuck on the first casing member 400 via a simple double-sided tape that is not conductive. However, the double-sided tape is the same as an air layer, in terms of electricity. Thus, it is known that even if no gap seems to be formed, the static electricity passes through the double-sided tape, and may cause the failure of an electric component.

In the present embodiment, however, the whole circumference of the second document-feeding-reading glass 313 is stuck on the first casing member 400 via the conductive sheet member 1501, as illustrated in FIG. 15. Thus, the risk caused by the static electricity can be avoided. That is, the glass earth sheet 1400 is disposed on the edge portion 402a or the first casing member 400 so as to surround the whole circumference of the opening portion 402. In this configuration, the glass earth sheet 1400 discharges the static electricity applied from the lower conveyance path 11b side to the second document-feeding-reading glass 313.

Next, the relationship between the size of the glass earth sheet 1400 and the size of the opening portion 402 will be described. In the present embodiment, the glass earth sheet 1400 is formed such that the size and width of the glass earth sheet 1400 are equal to those of the edge portion 402a. As a result, the sticking area of the double-sided tape can be increased, so that the force for sticking the second document-feeding-reading glass 313 to the first casing member 400 and keeping the second document-feeding-reading glass 313 on the first casing member 400 can be increased. In another case, the glass earth sheet 1400 may be formed like a thin line for discharging the static electricity. In this case, however, since the sticking area of the double-sided tape is decreased, it is necessary to dispose another member, in addition to the glass earth sheet 1400, that keeps the second document-feeding-reading glass 313 on the first casing member 400. The glass earth sheet 1400 may overlap with the opening portion 402 unless the glass earth sheet 1400 interferes with the reading operation of the CIS 311.

Figure 16:
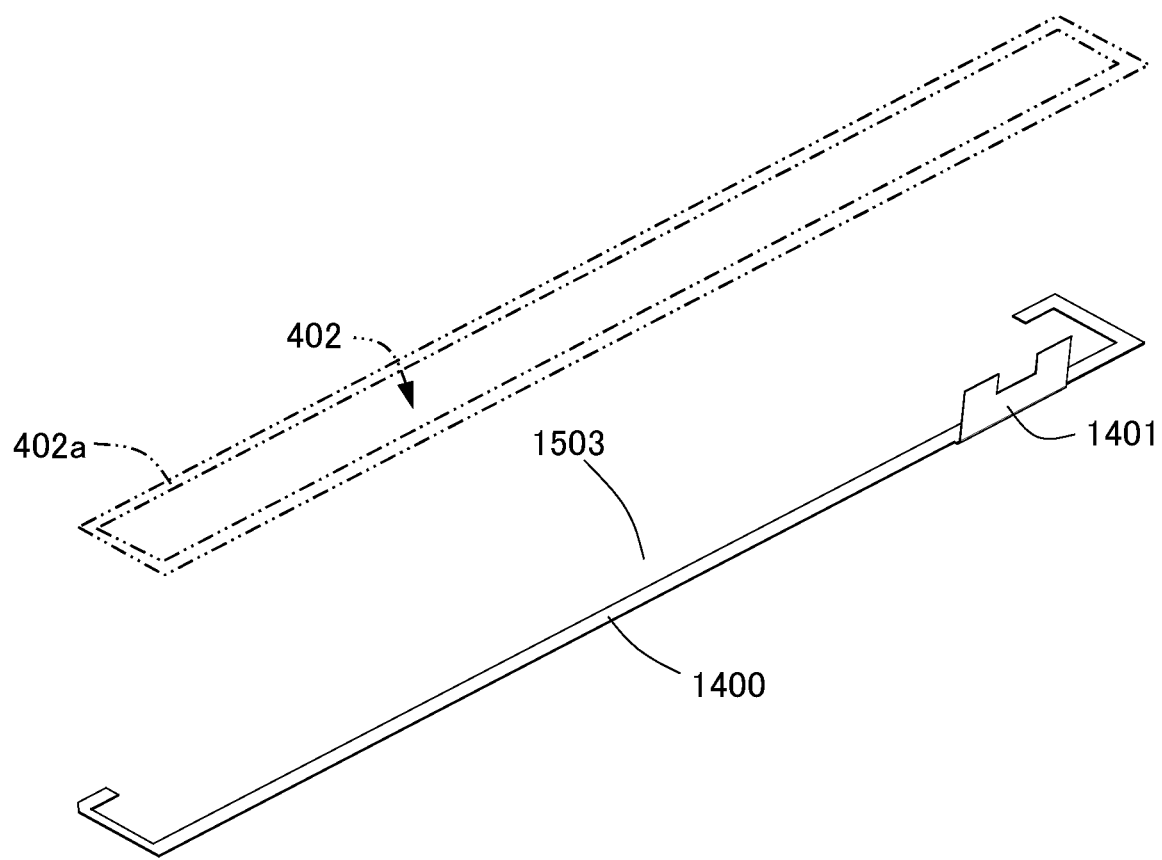
FIG. 16 is a perspective view illustrating a glass earth sheet of a modification of the present embodiment.
Figure 17:
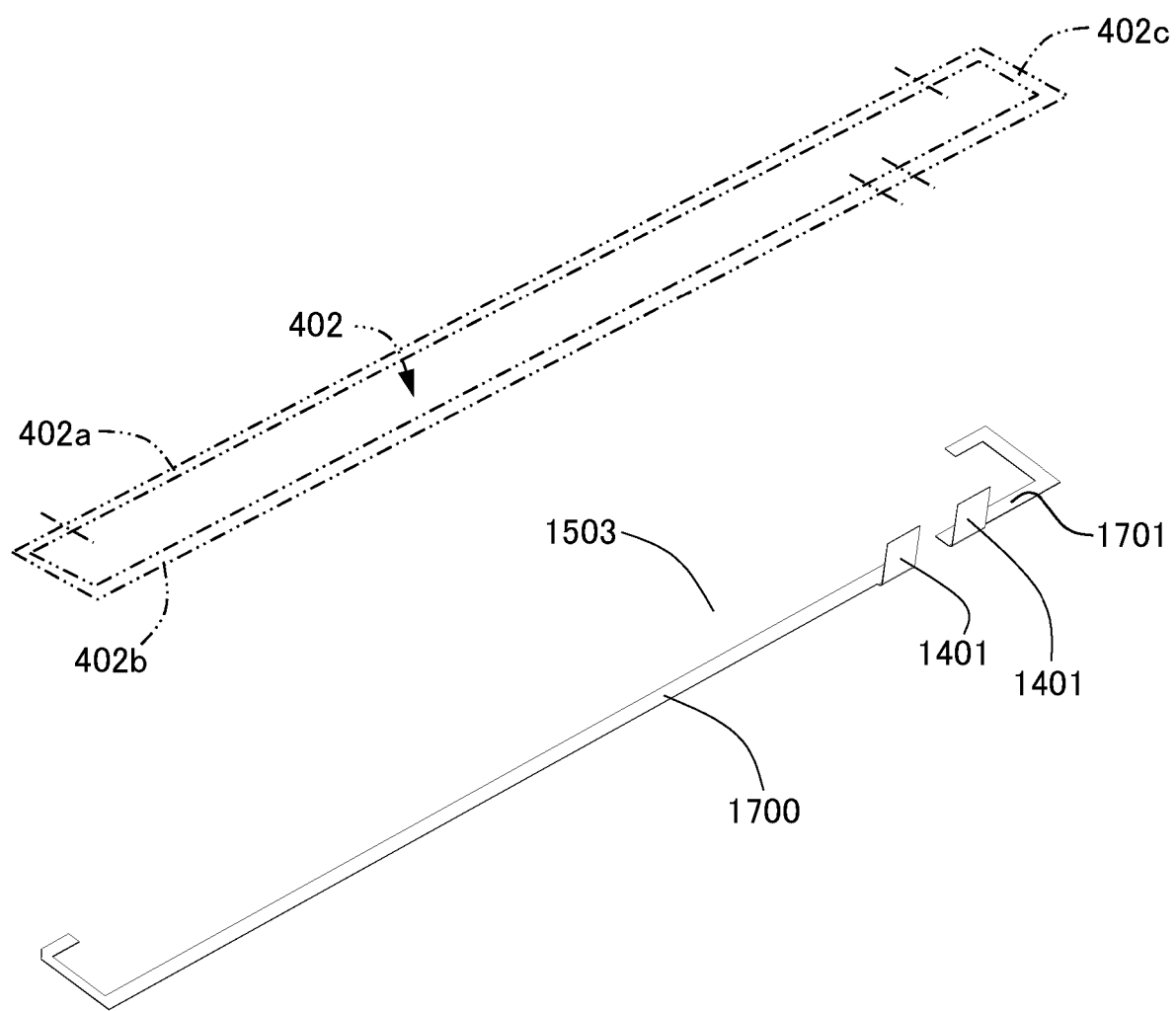
FIG. 17 is a perspective view illustrating a glass earth sheet of another modification of the present embodiment.

Note that there is a case where it is not necessary to cover the whole circumference of the second document-feeding-reading glass 313 with the conductive sheet member 1501 because of the layout of electric elements. In this case, one portion of the glass earth sheet 1400 may be cut out, for example, as illustrated in FIG. 16. That is, the glass earth sheet 1400 may be disposed on the edge portion 402a or the first casing member 400 so as to extend along a portion of the opening portion 402. Furthermore, if necessary for the ease of assembly or the like, the glass earth sheet 1400 may be constituted by a plurality of glass earth sheets, as illustrated in FIG. 17, disposed on different portions of the edge portion 402a. That is, the edge portion 402a or the opening portion 402 includes a first portion 402b, and a second portion 402c different from the first portion 402b. The first portion 402b is provided with a first glass earth sheet 1700 that is one example of a first shield member, and the second portion 402c is provided with a second glass earth sheet 1701 that is one example of a second shield member. The first glass earth sheet 1700 and the second glass earth sheet 1701 have the same structure as that of the glass earth sheet 1400, except that they have shapes different from the shape of the glass earth sheet 1400.

If the glass earth sheet 1400 has a shape, as illustrated in FIGS. 16 and 17, which does not extend along the whole circumference of the opening portion 402, the glass earth sheet 1400 is required to have a configuration for compensating for the shape. That is, since the area of the double-sided adhesive tape decreases, it is desirable to fully check whether the second document-feeding-reading glass 313 will peel off, and use a double-sided tape in addition to the glass earth sheet, as appropriate. In addition, in a portion of the edge portion 402a on which the glass earth sheet 1400 is not stuck, foreign matter may enter the second reading unit 307 through a gap between the second document-feeding-reading glass 313 and the edge portion 402a. Thus, it is desirable that the gap be sealed with a double-sided tape.

Figure 18:
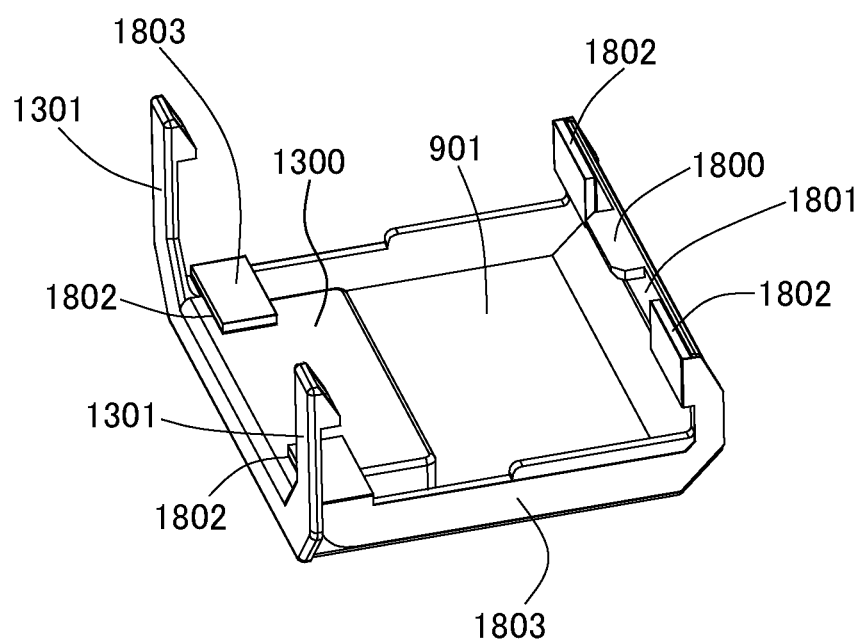
FIG. 18 is a perspective view illustrating an FFC cover member of the present embodiment.

Next, a configuration for grounding the electrical-connection portion 1401 of the glass earth sheet 1400 via the FFC cover member 901 will be described with reference to FIG. 18. FIG. 18 is a diagram illustrating a configuration of the FFC cover member 901 that covers the FFC earth sheet 3 of the present embodiment. As illustrated in FIG. 18, the FFC cover member 901 is provided with a surface 1801 that abuts against the first casing member 400, and the surface 1801 also abuts against the electrical-connection portion 1401 of the glass earth sheet 1400. On the abutment surface 1801, a catching portion 1800 is formed for catching a hole portion formed in the first casing member 400. The FFC cover member 901 includes the FFC fixing surface 1300 that fixes the FFC 9 and the FFC earth sheet 3. The FFC 9 and the FFC earth sheet 3 are nipped by the FFC fixing surface 1300 and the top surface of the second casing member 401, and thereby fixed.

The FFC cover member 901 is provided with snap-fit portions 1301. The snap-fit portions 1301 and the catching portion 1800 can be detachably attached to the second reading unit 307. In addition, four sponges 1802 that serve as elastic members are provided. Two of the sponges 1802 are disposed on the abutment surface 1801 of the FFC cover member 901, and the other two of the sponges 1802 are disposed on the FFC fixing surface 1300 of the FFC cover member 901. In addition, two conductive sheet members 1803 are provided. One of the conductive sheet members 1803 is disposed so as to connect the abutment surface 1801 and one of the sponges 1802 stuck on the FFC fixing surface 1300, and the other of the conductive sheet members 1803 is disposed so as to connect the abutment surface 1801 and the other of the sponges 1802 stuck on the FFC fixing surface 1300. The conductive sheet members 1803 are not required to have particular hardness and durability against bending. Thus, in the present embodiment, each of the conductive sheet members 1803 is an aluminum tape in which an adhesive layer is formed on an aluminum foil.

In this configuration, when the FFC cover member 901 is assembled to the second reading unit 307, one end portion of each of the conductive sheet members 1803 is brought into pressure contact with the electrical-connection portion 1401 of the glass earth sheet 1400 by the elastic force of a corresponding sponge 1802. In addition, the other end portion of each of the conductive sheet members 1803 is brought into pressure contact with the FFC earth sheet 3. As a result, all of the glass earth sheet 1400, the FFC earth sheet 3, and the earth wire 1101 are electrically connected with each other, and are electrically grounded. This configuration can make the number of components smaller than that in a configuration in which the glass earth sheet 1400 and the FFC earth sheet 3 are separately grounded.

Self-Supporting Operation

Figure 19:
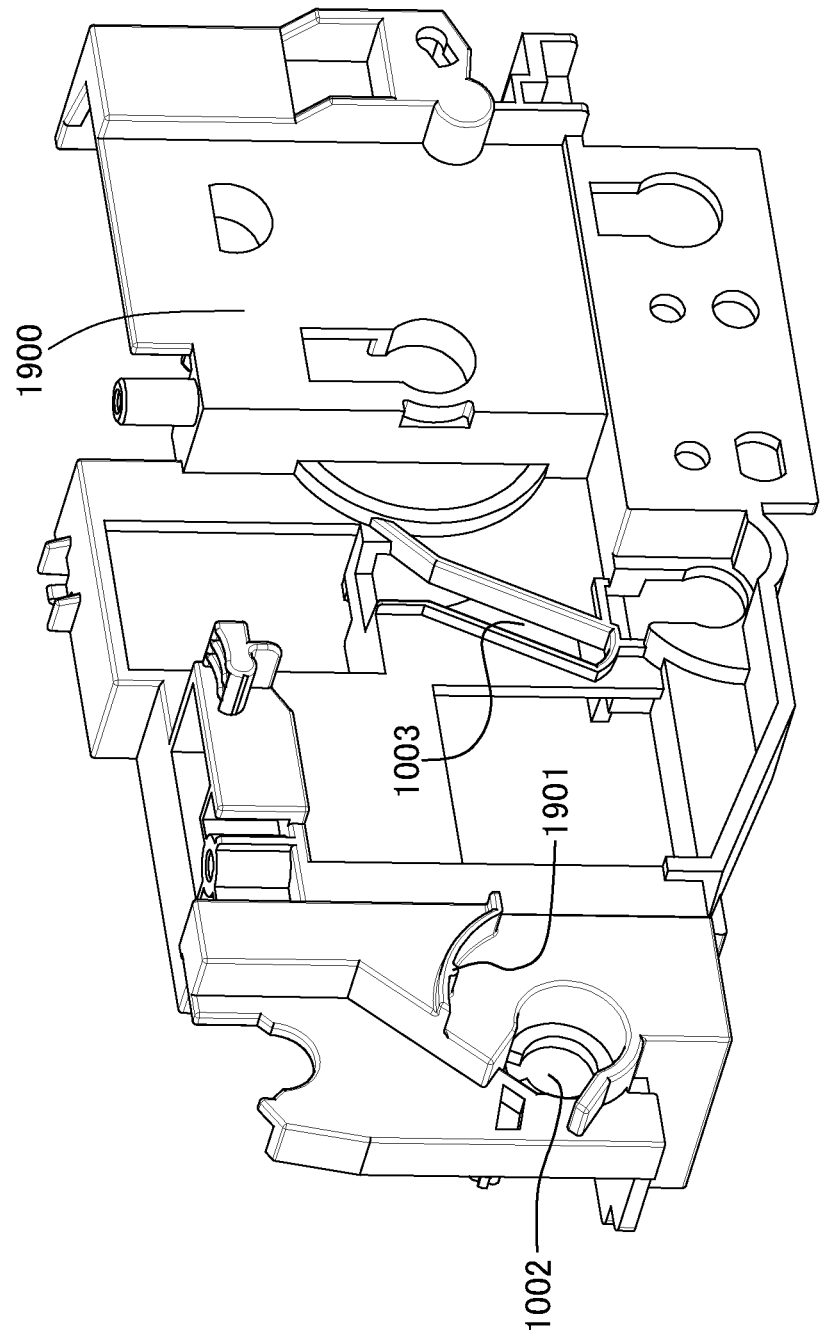
FIG. 19 is a perspective view illustrating a front side-plate of the present embodiment.
Figure 20:
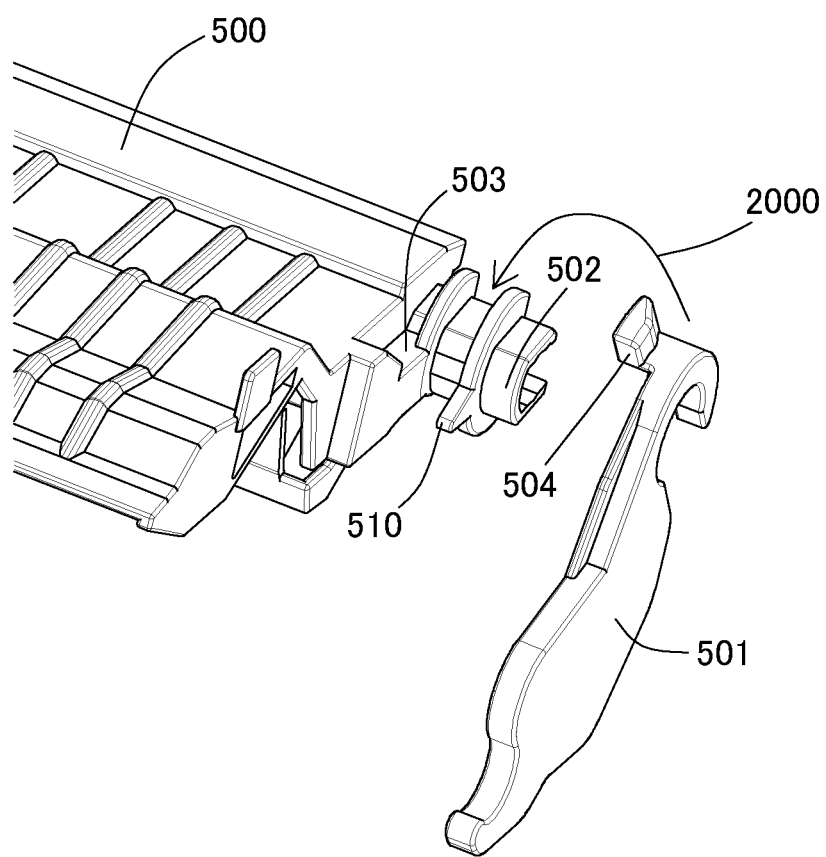
FIG. 20 is an exploded perspective view illustrating a separation guide member and a cam member of the present embodiment.
Figure 21:
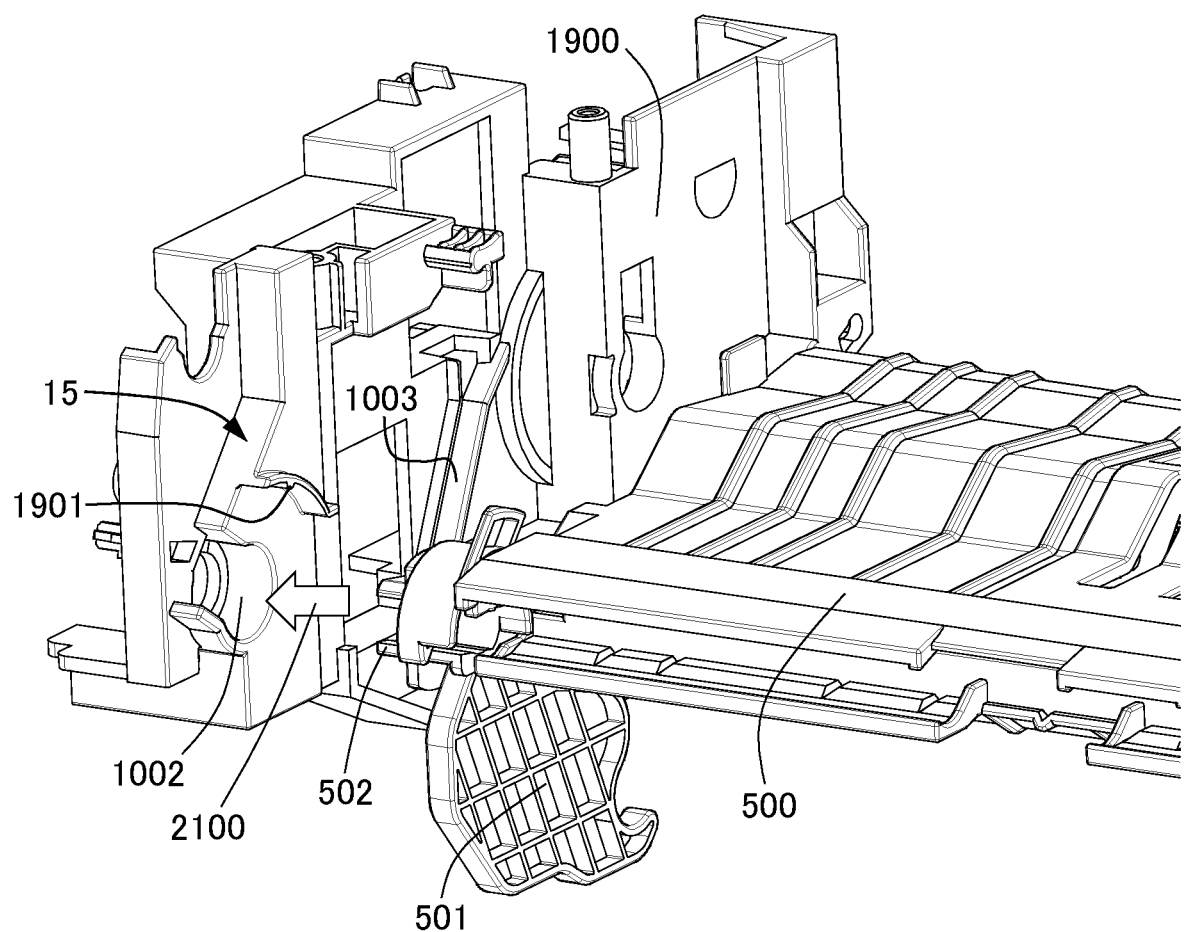
FIG. 21 is an exploded perspective view illustrating the front side-plate and the separation guide member of the present embodiment.
Figure 22:
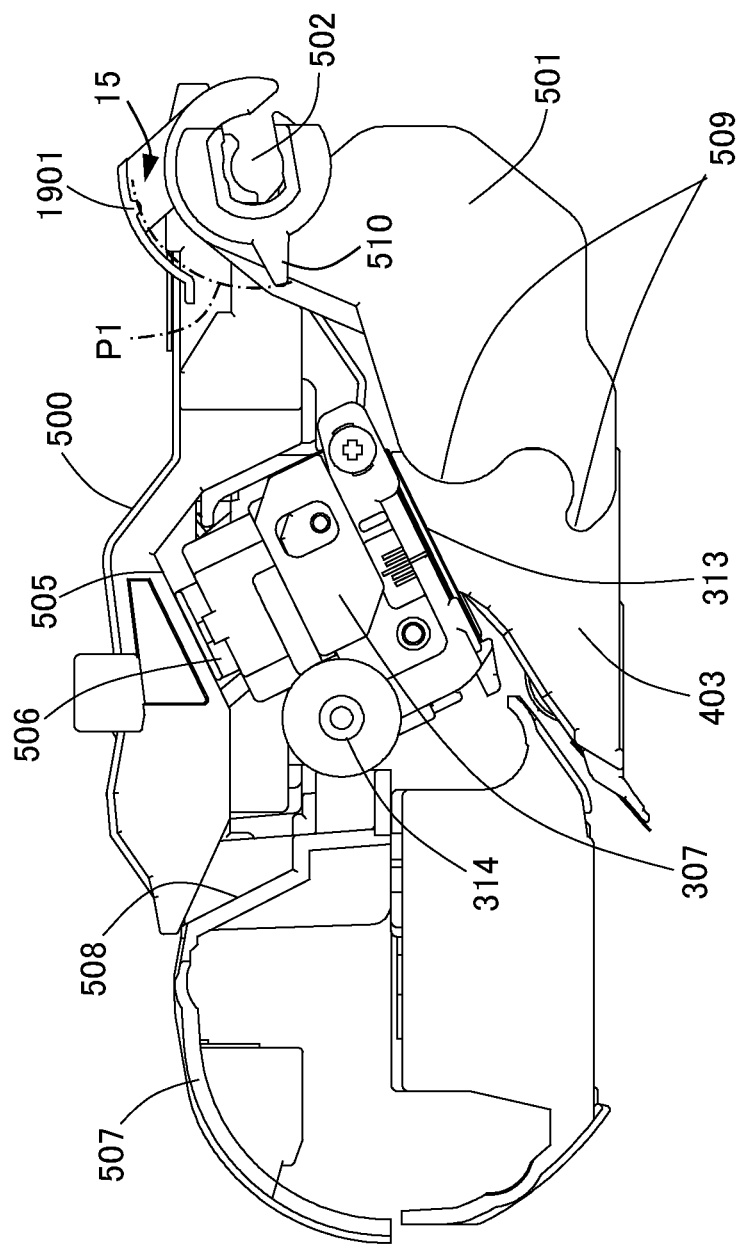
FIG. 22 is a front view illustrating a pivot regulation portion and a first projection portion of the present embodiment that are in a closed state.
Figure 24:
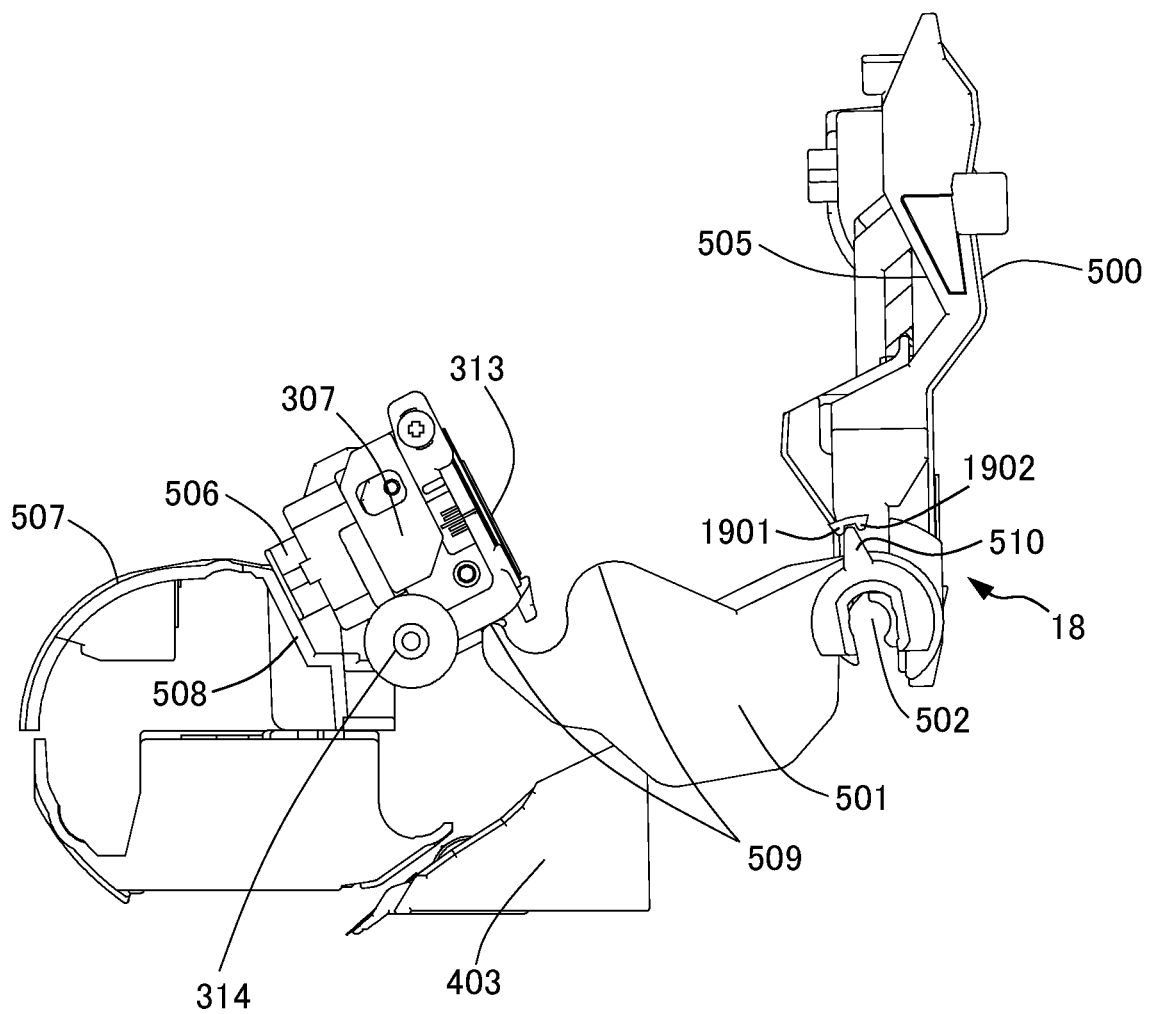
FIG. 24 is a front view illustrating a pivot regulation portion of a modification of the present embodiment.

Next, a self-supporting state of the separation guide member 500 and the second reading unit 307 will be described with reference to FIGS. 19 to 24. The self-supporting state is produced when the separation guide member 500 is pivoted until the separation guide member 500 enters the open state illustrated in FIG. 23 or 24. In the self-supporting state, the separation guide member 500 and the second reading unit 307 are regulated from pivoting. FIG. 19 is a diagram illustrating the second projection portion 1901 formed on the front side-plate 1900 of the present embodiment. FIG. 20 is a diagram illustrating a relationship between the separation guide member 500 and the cam member 501 of the present embodiment. FIG. 21 is a diagram illustrating a relationship between the separation guide member 500 and the front side-plate 1900 of the present embodiment. FIGS. 22 to 24 are diagrams each illustrating a relationship between the second projection portion 1901 and the first projection portion 510 of the present embodiment.

As illustrated in FIG. 19, the front side-plate 1900, which constitutes the main-body unit 102*a* of the ADF 102, is provided with a fitting groove portion 1003 that corresponds to a front pivot shaft 314 disposed in the second reading unit 307. The front pivot shaft 314 fits in the fitting groove portion 1003. In addition, the front side-plate 1900 is provided with a fitting hole portion 1002 that corresponds to a front pivot shaft 502 disposed in the separation guide member 500. The front pivot shaft 502 fits in the fitting hole portion 1002. The front side-plate 1900 includes the second projection portion 1901. The second projection portion 1901 will be described below.

As illustrated in FIG. 20, the cam member 501 is attached to a pivot shaft 502 of the separation guide member 500 on the front side-plate 1900 side. The cam member 501 is engaged with the pivot shaft 502 so as to be able to pivot around the pivot shaft 502. If the separation guide member 500 pivots by a predetermined angle or more (the separation guide member 500 is located in the intermediate position when pivoted by the predetermined angle), the first contact portion 503 formed in the separation guide member 500 and the second contact portion 504 formed in the cam member 501 abut against each other. As a result, the separation guide member 500 and the cam member 501 pivot in synchronization with each other. In the vicinity of the pivot shaft 502 of the separation guide member 500, the first projection portion 510 is formed. The first projection portion 510 will be described below.

Holding Mechanism

As illustrated in FIGS. 21 to 23, the holding mechanism 15 is disposed between the front side-plate 1900 and the pivot shaft 502 of the separation guide member 500. When the outer cover 12 is located in the third open position and the separation guide member 500 is located in the second open position, the holding mechanism 15 prevents the separation guide member 500 from returning to the second closed position due to the self-weight of the separation guide member 500, and holds the separation guide member 500 in the second open position. The holding mechanism 15 includes the second projection portion 1901 of the front side-plate 1900 and the first projection portion 510 of the separation guide member 500.

The first projection portion 510 is one example of an engaging portion, and is formed so as to extend from the pivot shaft 502 toward one side of a radial direction of a circle around a rotation axis of the pivot shaft 502 of the separation guide member 500. That is, the first projection portion 510 is disposed in the separation guide member 500 and extended toward a direction orthogonal to the rotation axis of the pivot shaft 502 of the separation guide member 500. The second projection portion 1901 is one example of an engaged portion, and is formed in the vicinity of the fitting hole portion 1002 so as to extend toward the other side of the radial direction. The second projection portion 1901 is disposed in the main-body unit 102*a* and the first projection portion 510 is engaged with the second projection portion 1901. In addition, the second projection portion 1901 is disposed at a position that overlaps with a movement trajectory P1 (see FIG. 22) of the first projection portion 510. The second projection portion 1901 is formed in the vicinity of the fitting hole portion 1002 of the front side-plate 1900, and functions as a pivot regulation portion. That is, the second projection portion 1901 abuts against the first projection portion 510, so that the second projection portion 1901 keeps the pivoted posture of the separation guide member 500 and prevents the separation guide member 500 from returning to its original posture.

Specifically, as illustrated in FIG. 23, when the separation guide member 500 pivots from the second closed position in the opening direction, the first projection portion 510 abuts against and climbs over the second projection portion 1901 on the movement trajectory P1 (illustrated in FIG. 22). The position of the separation guide member 500 in which the first projection portion 510 is in contact with the second projection portion 1901 in the closing direction, opposite to the opening direction, due to the self-weight of the separation guide member 500 is the second open position in which the separation guide member 500 is held. In the state where the separation guide member 500 is held in the second open position, the second reading unit 307 is located in the first open position, via the cam member 501.

As described above, the front side-plate 1900 and the separation guide member 500 are assembled to each other such that the pivot shaft 502 of the separation guide member 500 fits in the fitting hole portion 1002 of the front side-plate 1900. If the first projection portion 510 of the separation guide member 500 climbs over the second projection portion 1901 formed on the front side-plate 1900, the separation guide member 500 is prevented from returning to its original posture even if a user releases a hand from the separation guide member 500, so that the pivoted posture of the separation guide member 500 can be kept.

In addition, since the first contact portion 503 of the separation guide member 500 and the second contact portion 504 of the cam member 501 are in contact with each other, the pivoted posture of the cam member 501 is also kept. Furthermore, since the cam portion 509 of the cam member 501 supports the second reading unit 307, the pivoted posture of the second reading unit 307 is also kept. Thus, a user can perform the cleaning work for the second document-feeding-reading glass 313, which is disposed on the second reading unit 307, and the protective glass 404, which protects the white sheet 405, and the jam handling in a state where the hand of the user is separated from the separation guide member 500.

If external force is applied to the separation guide member 500 toward the second closed position when the separation guide member 500 is located in the second open position, the first projection portion 510 that is in contact with the second projection portion 1901 climbs over the second projection portion 1901. In this manner, the separation guide member 500 held in the second open position is released.

In the present embodiment, the description has been made for the case where only the second projection portion 1901 is used as the pivot regulation portion. However, the present disclosure is not limited to this. For example, as illustrated in FIG. 24, a holding mechanism 18 may be used as the pivot regulation portion. The holding mechanism 18 includes an abutting portion 1902 formed at a position to which the first projection portion 510 climbs over the second projection portion 1901. The abutting portion 1902 is disposed in the front side-plate 1900, and is formed in the vicinity of the fitting hole portion 1002 so as to extend toward the other side of the radial direction. In addition, the abutting portion 1902 is disposed at a position that overlaps with the movement trajectory P1 of the first projection portion 510, and is closer to the opening direction than the second projection portion 1901 is. In this case, when the separation guide member 500 is held in the second open position, the first projection portion 510 is prevented from pivoting toward the closing direction by the second projection portion 1901, and from pivoting toward the opening direction by the abutting portion 1902. In the present embodiment, the second projection portion 1901 and the abutting portion 1902 form a recess portion. Thus, when the separation guide member 500 is located in the second open position, the first projection portion 510 is prevented from pivoting over the abutment portion 1902 in the opening direction. As a result, the stability of the separation guide member 500 can be increased, so that the vibration or unstable movement of the separation guide member 500 can be suppressed. Note that on the back side of the main-body unit 102a, a back side-plate (not illustrated) is disposed, and in the back side-plate, a fitting groove portion and a fitting hole portion that are the same as those of the front side-plate 1900 are formed. The back side-plate supports the second reading unit 307 and the separation guide member 500, like the front side-plate 1900 does.

Next, one example of dynamic computation for achieving the self-supporting design that uses the first projection portion 510 and the second projection portion 1901, which serves as a pivot regulation portion, will be described with reference to FIGS. 25 to 28. FIGS. 25 to 28 are diagrams for describing, in dynamics, the self-support of the second reading unit 307 achieved by the second projection portion 1901 and the first projection portion 510 of the present embodiment. Note that the computation is one example of simplified computation that is performed under the condition in which a dynamic model is represented by a system of particles. Thus, the below-described computation may not necessarily be performed. For example, necessary forces may be computed through a three-dimensional simulation that uses a mechanism analysis tool or the like.

Figure 25:
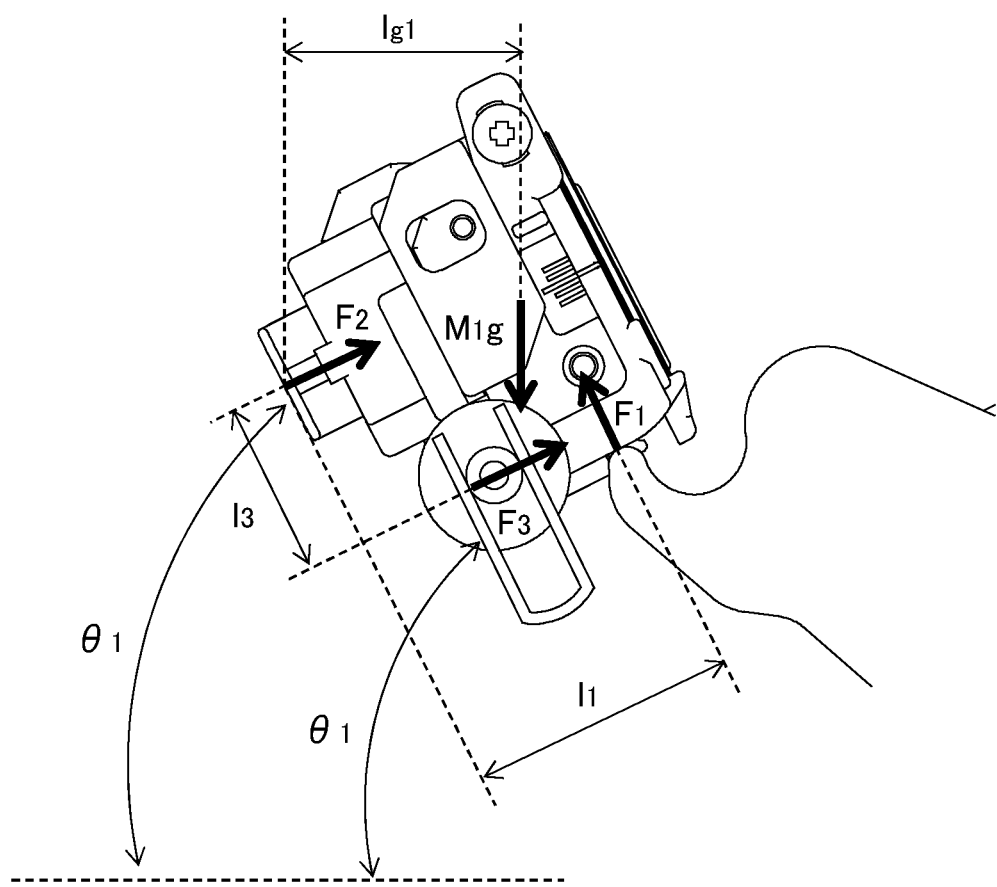
FIG. 25 is a front view illustrating forces applied to the second reading unit of the present embodiment when the second reading unit is located in an open position.

First, the equilibrium of forces applied to the second reading unit 307, and the equilibrium of moments applied to the second reading unit 307 are determined for the computation, by using FIG. 25. In FIG. 25, a parameter $M_1g$ is a self-weight of the second reading unit 307, a parameter $F_1$ is a force applied to the second reading unit 307 from the cam member 501, a parameter $F_2$ is a force applied to the second reading unit 307 from the angle regulation portion 508, and a parameter $F_3$ is a force applied to the second reading unit 307 from the fitting groove portion 1003. In addition, a parameter $l_1$ is a distance between the vector of the force $F_1$ and a point of application of the force $F_2$, a parameter $l_3$ is a distance between the vector of the force $F_3$ and the point of application of the force $F_2$, a parameter $l_{g1}$ is a distance between the vector of the force of the self-weight $M_1g$ and the point of application of the force $F_2$, and a parameter $\theta_1$ is a pivot angle of the second reading unit 307 with respect to the horizontal plane. The parameters $l_1$, $l_3$, $l_{g1}$, $\theta_1$, and $M_1g$ are known parameters, and the parameters $F_1$, $F_2$, and $F_3$ are unknown parameters.

In consideration of the equilibrium of forces in the vertical direction, the equilibrium of forces in the horizontal direction, and the equilibrium of moments around the point of application of the force $F_2$, the following equations (1) to (3) are satisfied.

$$M_1g - F_1 \sin\theta_1 - F_2 \cos\theta_1 - F_3 \cos\theta_1 = 0 \quad (1)$$

$$F_1 \cos\theta_1 - F_2 \sin\theta_1 - F_3 \sin\theta_1 = 0 \quad (2)$$

$$M_1 g l_{g1} - F_1 l_1 - F_3 l_3 = 0 \quad (3)$$

By solving the simultaneous equations (1) to (3), equations (4) to (6) can be obtained as solutions.

$$F_1 = M_1 g \sin\theta_1 \quad (4)$$

$$F_2 = \frac{l_3 \cos\theta_1 + l_1 \sin\theta_1 - l_{g1}}{l_3} M_1 g \quad (5)$$

$$F_3 = \frac{l_{g1} - l_1 \sin\theta_1}{l_3} M_1 g \quad (6)$$

Figure 26:
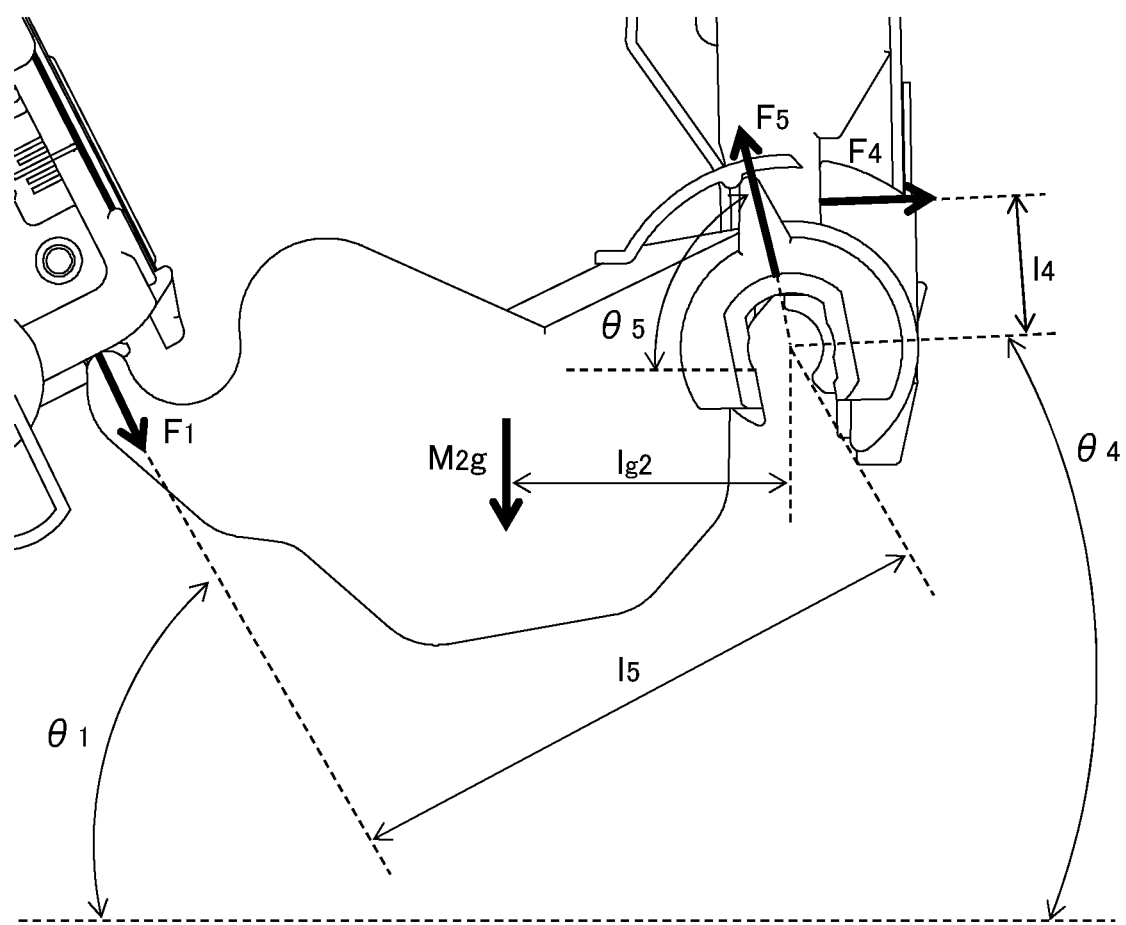
FIG. 26 is a front view illustrating forces applied to the cam member when the second reading unit of the present embodiment is located in the open position.

Next, the equilibrium of forces applied to the cam member 501, and the equilibrium of moments applied to the cam member 501 are determined for the computation, by using FIG. 26. A parameter $M_2g$ is a self-weight of the cam member 501, a parameter $F_1$ is a reaction force (of the calculated force) applied from the second reading unit 307 to the cam member 501, and a parameter $F_4$ is a force applied from the first contact portion 503 of the separation guide member 500 to the second contact portion 504 of the cam member 501. A parameter $F_5$ is a force applied from the pivot shaft 502 of the separation guide member 500 to a fitting portion of the cam member 501 that fits to the separation guide member 500. In addition, a parameter $l_4$ is a distance between the vector of the force $F_4$ and the axis of the pivot shaft 502, a parameter $l_5$ is a distance between the vector of the force $F_1$ and the axis of the pivot shaft 502, and a parameter $l_{g2}$ is a distance between the vector of the force of the self-weight $M_2g$ and the axis of the pivot shaft 502. A parameter $\theta_4$ is an angle of the vector of the force $F_4$ with respect to the horizontal plane, and a parameter $\theta_5$ is an angle of the vector of the force $F_5$ with respect to the horizontal plane. The parameters $l_4$, $l_5$, $l_{g2}$, $\theta_4$, $F_1$, and $M_2g$ are known parameters, and the parameters $F_4$, $F_5$, and $\theta_5$ are unknown parameters.

In consideration of the equilibrium of forces in the vertical direction, the equilibrium of forces in the horizontal direction, and the equilibrium of moments around the axis of the pivot shaft 502, the following equations (7) to (9) are satisfied.

$$M_2g - F_1 \sin\theta_1 - F_5 \cos\theta_5 - F_4 \cos\theta_4 = 0 \qquad (7)$$

$$F_1 \cos\theta_1 - F_4 \sin\theta_4 - F_3 \sin\theta_5 = 0 \qquad (8)$$

$$M_2 g l_{g2} - F_1 l_5 - F_4 l_4 = 0 \qquad (9)$$

By solving the simultaneous equations (7) to (9), equations (10) to (12) can be obtained as solutions.

$$F_4 = \frac{1}{l_4}(M_2 g l_{g2} + M_1 g \sin\theta_1 l_5) \qquad (10)$$

$$F_5 = \sqrt{\alpha^2 + \beta^2} \qquad (11)$$

$$\theta_5 = \arccos\left(\frac{\beta}{\sqrt{\alpha + \beta^2}}\right) \qquad (12)$$

Note that in the equations (11) and (12), parameters $\alpha$ and $\beta$ are known parameters defined in equations (13) and (14).

$$\alpha = M_2 g + F_1 \sin\theta_1 - F_4 \sin\theta_4 \qquad (13)$$

$$\beta = F_1 \cos\theta_1 + F_4 \cos\theta_4 \qquad (14)$$

Figure 27:
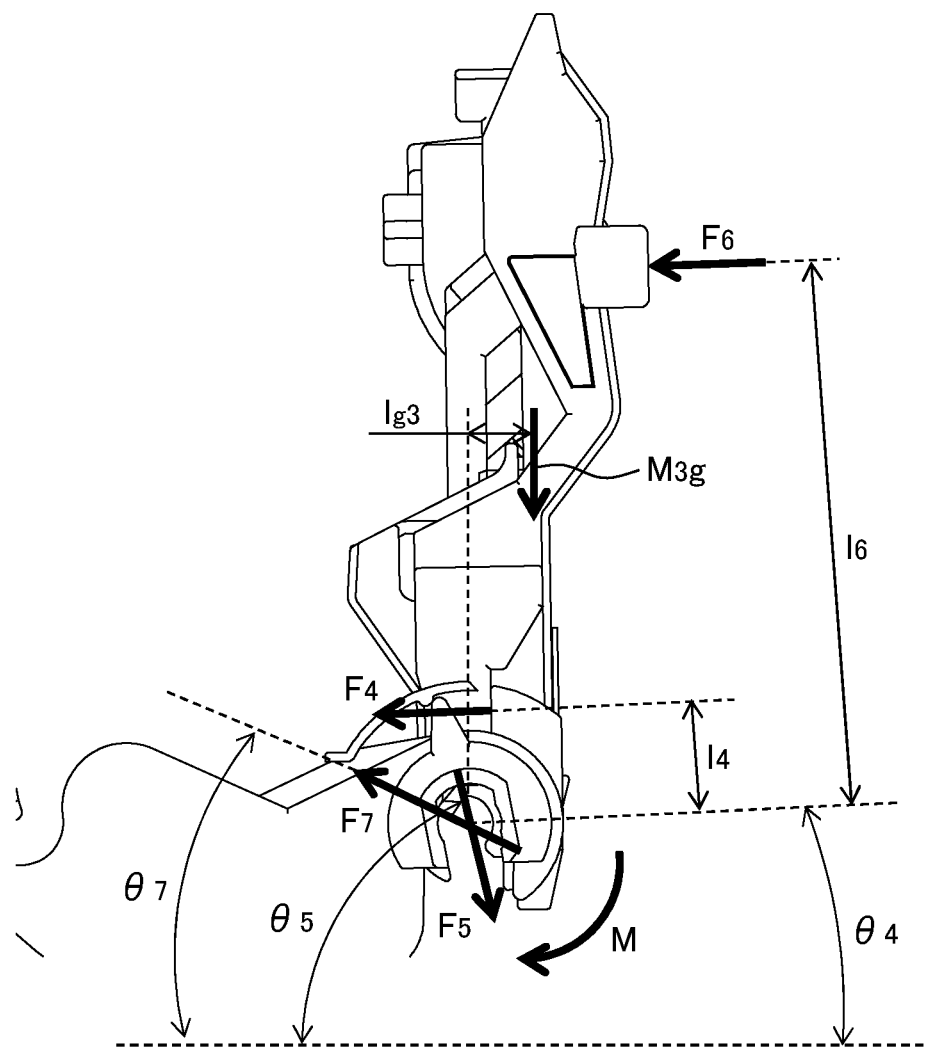
FIG. 27 is a front view illustrating forces applied to the separation guide member of the present embodiment when the separation guide member is located in an open position.

Next, the equilibrium of forces applied to the separation guide member 500, and the equilibrium of moments applied to the separation guide member 500 are determined for the computation, by using FIG. 27. A parameter $M_3g$ is a self-weight of the separation guide member 500; a parameter $F_4$ is a reaction force of the above-described force, applied from the second contact portion 504 of the cam member 501 to the first contact portion 503 of the separation guide member 500; and a parameter $F_5$ is a reaction force of the above-described force, applied from the fitting portion of the cam member 501 to the pivot shaft 502. A parameter $F_6$ is a force applied from a user to release the separation guide member 500 from the self-supporting state. The parameter $F_6$ is a design parameter for determining the force to release the separation guide member 500 from the self-supporting state. A parameter $F_7$ is a force applied from the fitting hole portion 1002 of the front side-plate 1900 to the pivot shaft 502. In addition, a parameter $l_4$ is a distance between the vector of the force $F_4$ and the axis of the pivot shaft 502, and a parameter $l_{33}$ is a distance between the vector of the force of the self-weight $M_3g$ and the axis of the pivot shaft 502. A parameter $\theta 4$ is an angle of the vector of the force $F_4$ with respect to the horizontal plane, a parameter $\theta_5$ is an angle of the vector of the force $F_5$ with respect to the horizontal plane, and a parameter $\theta_7$ is an angle of the vector of the force $F_7$ with respect to the horizontal plane. If the first projection portion 510 and the second projection portion 1901 are not formed, the separation guide member 500 is caused to return to the original posture by the above-described forces. A parameter M is a moment produced around the pivot shaft 502 and necessary for preventing the separation guide member 500 from returning to the original posture. The parameters $l_4$, $l_6$, $l_{g3}$, $\theta_4$, $\theta_5$, $F_4$, $F_5$, $F_6$, and $M_3g$ are known parameters, and the parameters $F_7$, $\theta_7$, and M are unknown parameters.

In consideration of the equilibrium of forces in the vertical direction, the equilibrium of forces in the horizontal direction, and the equilibrium of moments around the axis of the pivot shaft 502, the following equations (15) to (17) are satisfied.

$$M_3g - F_4 \sin\theta_4 - F_6 \cos\theta_4 - F_5 \cos\theta_5 - F_7 \cos\theta_7 = 0 \qquad (15)$$

$$F_4 \cos\theta_4 - F_6 \sin\theta_4 - F_5 \sin\theta_5 - F_7 \cos\theta_7 = 0 \qquad (16)$$

$$M = F_4 l_4 + M_3 g l_{g3} - F_6 l_6 = 0 \qquad (17)$$

By using the equations (10) and (17), the following equation (18) can be obtained. By using the equation (18), the moment M necessary for the self-support of the separation guide member 500 can be calculated. The description of the parameters $F_7$ and $\theta_7$ will be omitted because they are not used in the following calculations.

$$M = M_1 \sin\theta_1 l_5 + M_2 g l_{g2} - M_3 g l_{g3} + F_6 l_6 \qquad (18)$$

Figure 28:
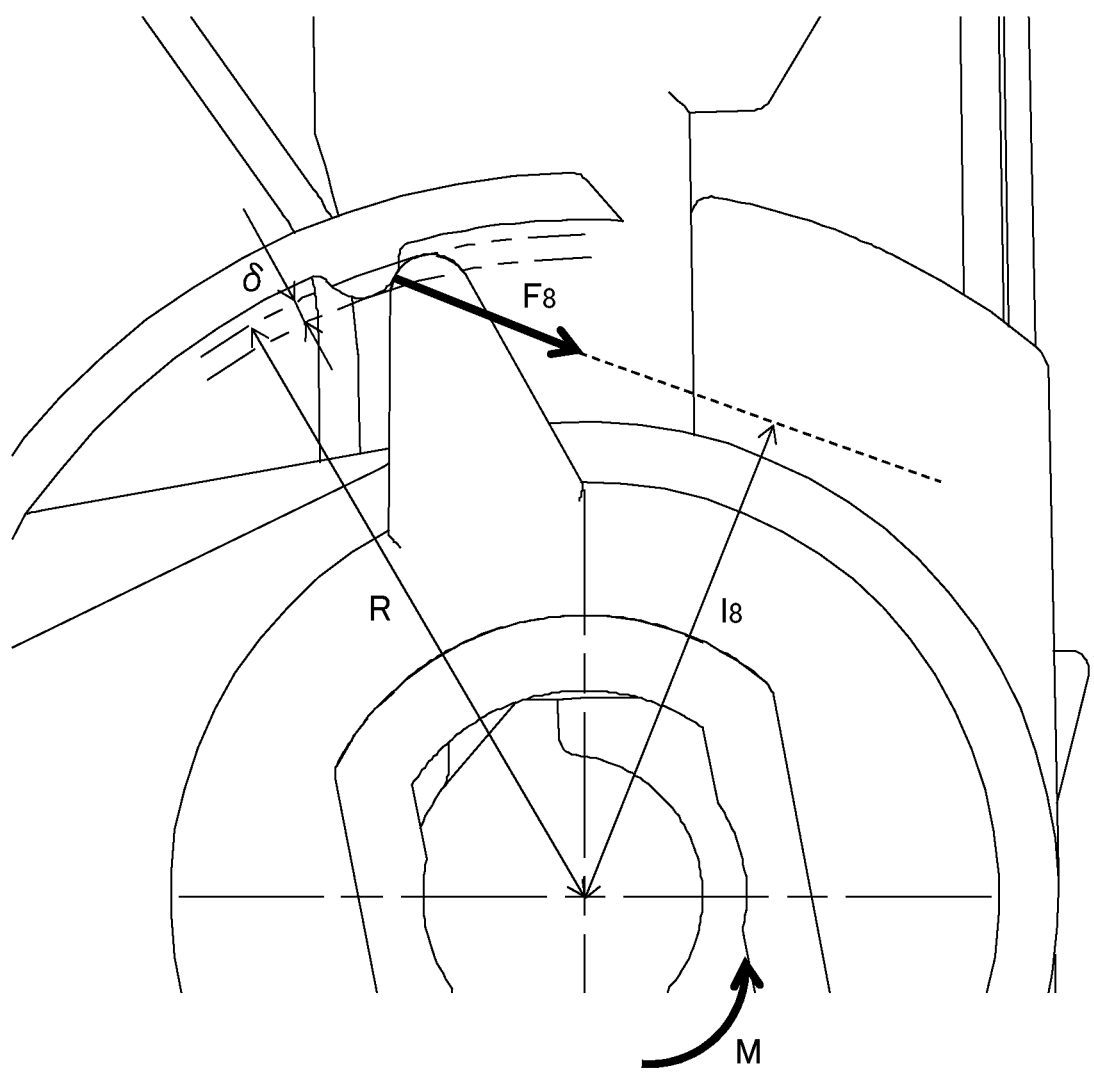
FIG. 28 is an enlarged front view illustrating a force applied to a second projection portion when the separation guide member of the present embodiment is located in the open position.

Next, as illustrated in FIG. 28, a force $F_8$ applied to the first projection portion 510 of the separation guide member 500 by the second projection portion 1901 of the front side-plate 1900 and necessary for the self-support of the separation guide member 500 is determined. A parameter $l_8$ is a distance between the vector of the force $F_8$ and the axis of the pivot shaft 502, a parameter R is a distance between the leading end of the first projection portion 510 and the axis of the pivot shaft 502 in a radial direction.

By using the equation of the equilibrium of moments and the equation (18), the following equation (19) is satisfied.

$$F_8 = \frac{1}{l_8}(M_1 \sin\theta_1 l_5 + M_2 g l_{g2} - M_3 g l_{g3} + F_6 l_6) \qquad (19)$$

Thus, the force applied to the leading end of the first projection portion 510, and the force applied to the second projection portion 1901 as the reaction force can be determined by using the equation (19). In addition, the load determined by using the equation (19) may be designed by using a static structure simulation tool, such as the finite element method. For example, the radius R and the amount of engagement $\delta$ between the first projection portion 510 and the second projection portion 1901 may be designed such that if the force $F_6$ is smaller than a target force for releasing the separation guide member 500 from the self-supporting state, the amount of deformation of the second projection portion 1901 is smaller than the amount of engagement $\delta$ of the first projection portion 510. In addition, the radius R and the amount of engagement $\delta$ between the first projection portion 510 and the second projection portion 1901 may be designed such that if the force $F_6$ is equal to or larger than the target force for releasing the separation guide member 500 from the self-supporting state, the amount of deformation of the second projection portion 1901 is larger than the amount of engagement $\delta$ of the first projection portion 510.

The design has to be performed so that the second projection portion 1901 deforms within an elastic deformation range. In addition, the design has to be performed in consideration of the characteristics (e.g., S-N curve) of the material of the second projection portion 1901 so that the second projection portion 1901 is not plastically deformed in shape or damaged before the expected number of pivots is reached. In the present embodiment, it is preferable that the front side-plate 1900, which forms the second projection portion 1901, be made of ABS, the force $F_6$ be 110 gf, the radius R be 16.7 mm, and the amount of engagement δ be 0.6 mm.

By the way, Japanese Patent Application Publication No. 2005-194011 describes the image reading apparatus that includes a pivot unit that accommodates the CIS used for the back side of a sheet, and that forms the upper conveyance path. In such an image reading apparatus, it is possible to access the lower conveyance path, to which the CIS used for the back side of a sheet is exposed, by opening the outer cover, and by opening the lower conveyance path by pivoting the pivot unit. In the image reading apparatus, however, since the pivot shaft of the pivot unit and the CIS used for the back side of a sheet are separated significantly from each other, the FFC is bent more when the pivot unit pivots, which may deteriorate the durability. For solving this problem, it was conceived that the pivot unit is divided into two units such that the two units are both opened upward, and that one unit includes the CIS used for the back side of a sheet and the other unit forms the upper conveyance path. In this configuration alone, however, since the CIS used for the back side of a sheet and the upper conveyance path have to be held separately when a user accesses the lower conveyance path, the workability is poor. In the present embodiment, the opening and closing of the second reading unit 307 is performed in accordance with the opening and closing of the separation guide member 500 that forms the upper conveyance path 11a. In addition, by holding the separation guide member 500, the access to the lower conveyance path 11b is made easier.

As described above, the image forming apparatus 1 of the present embodiment includes the holding mechanism 15 or 18, and the cam member 501. Thus, when the outer cover 12 is located in the third open position and the separation guide member 500 is located in the second open position, the separation guide member 500 can be prevented from returning to the second closed position due to the self-weight of the separation guide member 500, and can be held in the second open position. In addition, when the separation guide member 500 is pivoted from the second closed position to the second open position, the cam member 501 moves in accordance with the movement of the separation guide member 500, and presses the second reading unit 307 in a direction in which the second reading unit 307 pivots from the first closed position to the first open position. In this manner, the second reading unit 307 is held in the first open position. As a result, the access to the lower conveyance path 11b can be made easier, and the workability for a user to access the lower conveyance path 11b, to which the second reading unit 307 is exposed, and perform the work can be improved.

In addition, in the image forming apparatus 1 of the present embodiment, since the holding mechanisms 15 and 18 have a configuration in which one projection portion engages with another projection portion, the configuration can be achieved simply and inexpensively.

In the above-described embodiment, the cam member 501 presses the second reading unit 307 upward, and the second reading unit 307 pivots to the closed position due to the self-weight of the second reading unit 307 when the separation guide member 500 is moved to the closed position. However, the present disclosure is not limited to this. For example, the interlocking member may serve as a positive motion cam, and link the separation guide member 500 and the second reading unit 307. In this case, regardless of whether the self-weight of the second reading unit 307 is applied to the second reading unit 307, the second reading unit 307 can be moved to the closed position in accordance with the movement of the separation guide member 500 to the closed position. In another case, the separation guide member 500 and the second reading unit 307 may be linked with each other via a gear train, and moved with each other. In this case, a surface of a gear serves as the interlocking member, and the second reading unit 307 is pivoted by the pivot of the separation guide member 500.

In addition, in the above-described embodiment, the description has been made for the case where the cam member 501, which is a component separate from the separation guide member 500, is used as the interlocking member. However, the present disclosure is not limited to this. For example, the interlocking member may be formed integrally with a portion of the separation guide member 500, and the second reading unit 307 may be pressed by the interlocking member.

Another Embodiment

Next, another embodiment of the present invention will be described in detail with reference to FIGS. 29 to 33. The present embodiment differs from the above-described embodiment in that a holding mechanism 19 that uses a fan portion 520 and a stopper 530 is used instead of the holding mechanism 15, which includes the first projection portion 510 and the second projection portion 1901. Since the other configuration of the present embodiment is the same as that of the above-described embodiment, a component identical to a component of the above-described embodiment is given an identical symbol and the detailed description thereof will be omitted.

Figure 29:
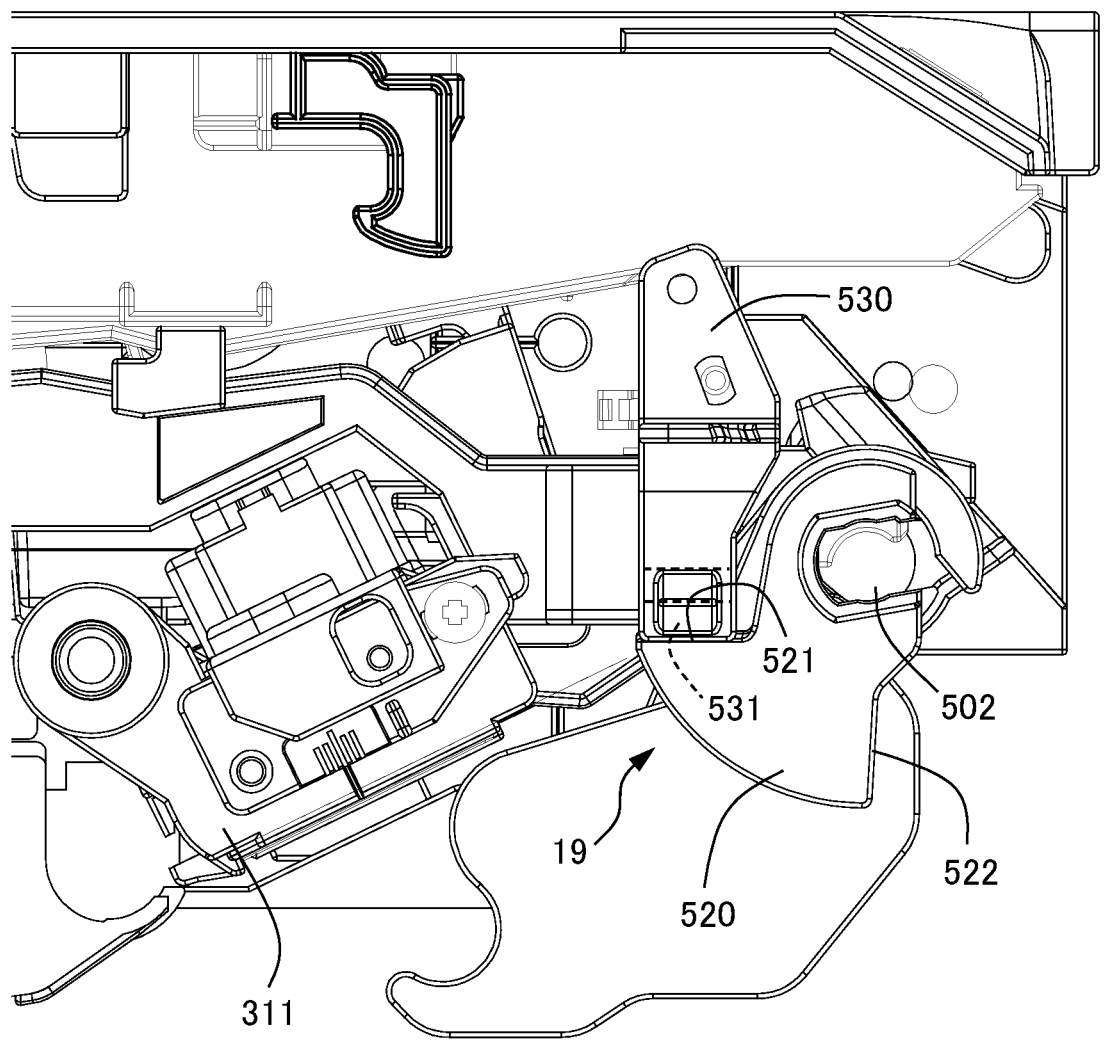
FIG. 29 is a front view illustrating a state where a second reading unit and a separation guide member of another embodiment are located in closed positions.

In the present embodiment, an image reading apparatus 10 includes a separation guide member 500A and a front side-plate 1900A. As illustrated in FIG. 29, the holding mechanism 19 includes the fan portion 520 formed integrally with the separation guide member 500A, and the stopper 530 disposed in the front side-plate 1900A.

Figure 30:
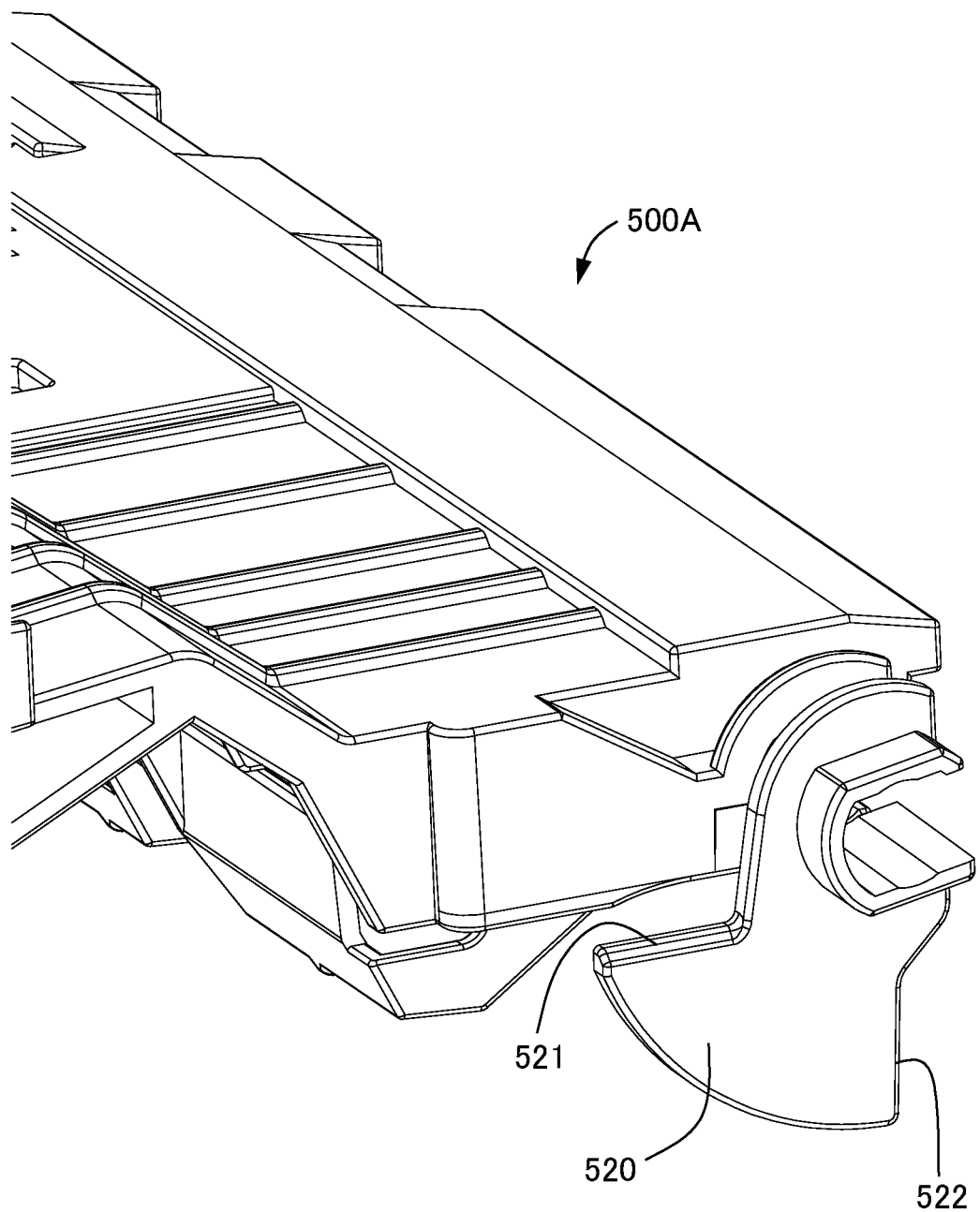
FIG. 30 is a perspective view illustrating a fan portion of the other embodiment.

As illustrated in FIGS. 29 and 30, the fan portion 520 pivots around the pivot shaft 502 in accordance with the pivot of the separation guide member 500A. The fan portion 520 includes a portion shaped like a fan when viewed from the axial direction of the pivot shaft 502. The fan-shaped portion of the fan portion 520 includes a first side 521 and a second side 522 that are linear, and that form an angle of about 90 degrees. That is, the fan portion 520 is one example of an engaging portion, and is disposed in the separation guide member 500A so as to extend toward a radial direction of a circle around the rotation axis of the separation guide member 500A.

Figure 31:
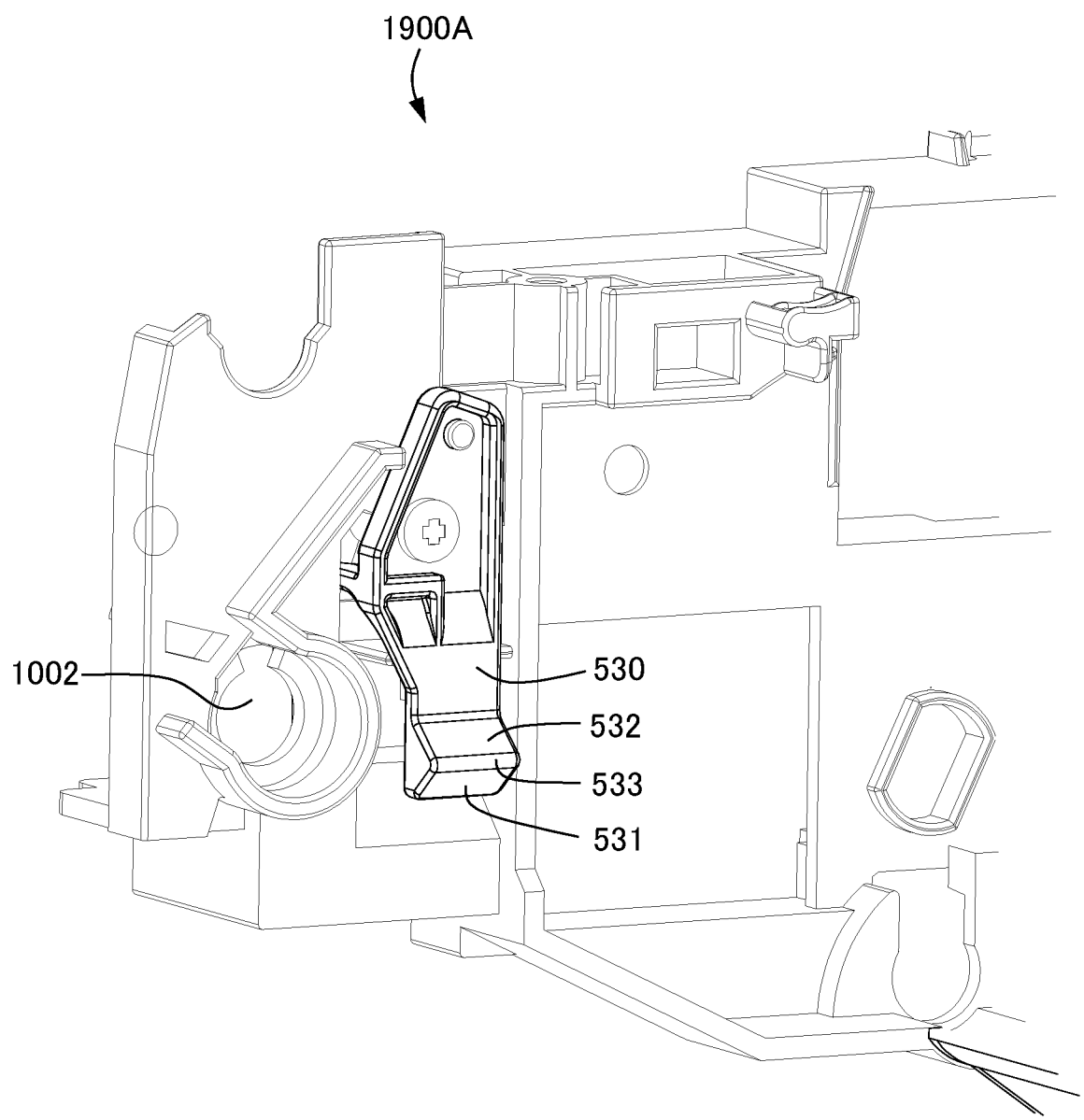
FIG. 31 is a perspective view illustrating a stopper of the other embodiment.

As illustrated in FIGS. 29 and 31, the stopper 530 is made of resin, and the upper portion of the stopper 530 is fixed to the front side-plate 1900A via a screw. The lower end of the stopper 530 serves as a leading end, and can elastically deform in the axial direction of the pivot shaft 502. The stopper 530 is disposed in front of the fan portion 520 in the axial direction of the pivot shaft 502. In a lower portion of the stopper 530, a first surface 531 and a second surface 532 are formed. The first surface 531 projects backward in the axial direction of the pivot shaft 502, and is sloped so as to face an obliquely downward direction. The second surface 532 projects backward in the axial direction of the pivot shaft 502, and is sloped so as to face an obliquely upward direction. The first surface 531 is formed so as to be continuous with the lower portion of the second surface 532, and a projecting leading-edge portion 533 is formed in a continuous portion between the first surface 531 and the second surface 532. The first surface 531, the second surface 532, and the leading-edge portion 533 elastically move back and forth in the axial direction of the pivot shaft 502, in accordance with the elastic deformation of the lower portion of the stopper 530. The stopper 530 is one example of an engaged portion, and is disposed in the front side-plate 1900A so as to extend toward the rotation-axis direction. In addition, the stopper 530 is disposed at a position that overlaps with a movement trajectory of the fan portion 520. Note that although the first surface 531 and the second surface 532 are flat surfaces in the present embodiment, the first surface 531 and the second surface 532 are not limited to flat surfaces. For example, the first surface 531 and the second surface 532 may be curved surfaces.

Figure 32:
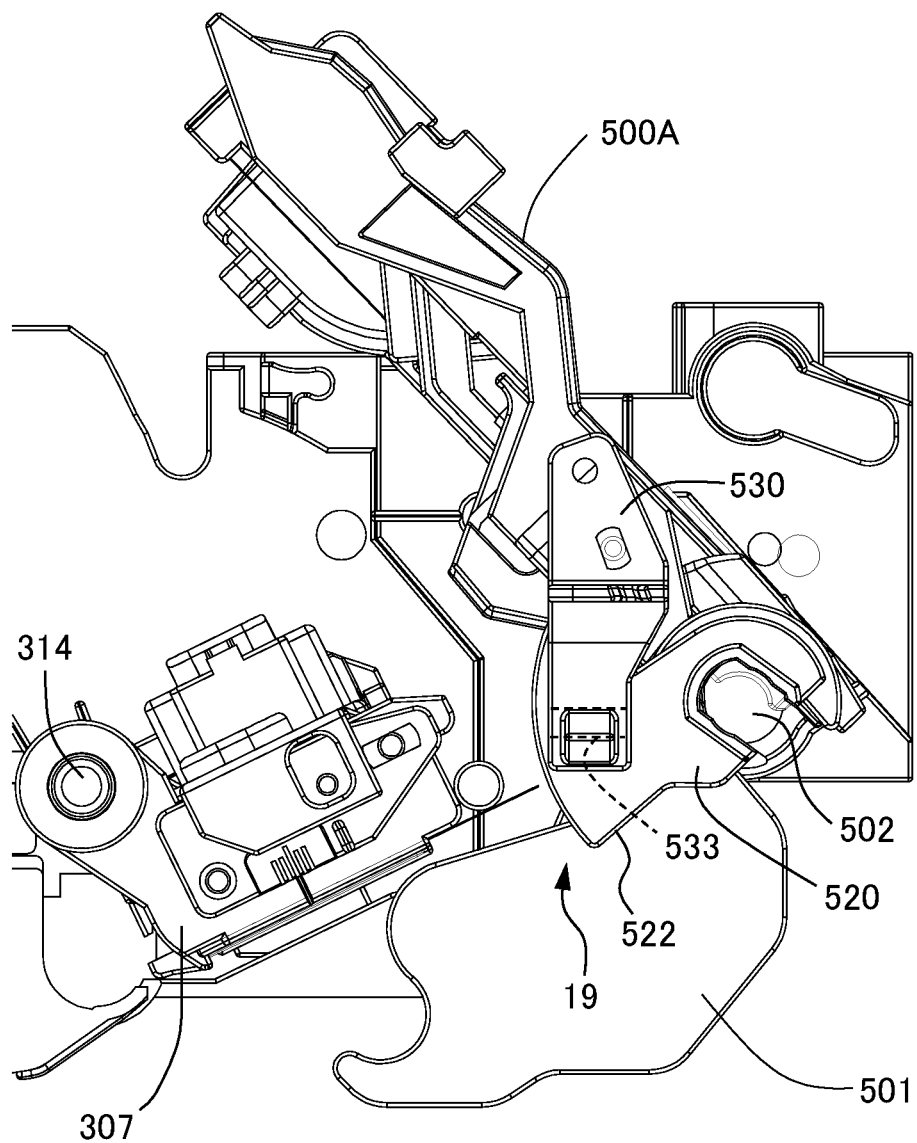
FIG. 32 is a front view illustrating a state where the separation guide member of the other embodiment is pivoted.

Next, an operation performed by the holding mechanism 19 for allowing the self-support of the separation guide member 500A will be described with reference to FIGS. 29, 31, and 32. As illustrated in FIG. 29, in a state where the separation guide member 500A is closed, the first side 521 of the fan portion 520 and the first surface 531 of the stopper 530 are located, with a predetermined clearance being formed between the first side 521 and the first surface 531. If the pivot of the separation guide member 500A is started, the first side 521 of the fan portion 520 and the first surface 531 of the stopper 530 contact each other. Then, as illustrated in FIG. 32, the stopper 530 bends in the rotation-axis direction, so that the leading-edge portion 533 of the stopper 530 and a front surface of the fan portion 520 contact each other. While the separation guide member 500A is pivoting, the leading-edge portion 533 of the stopper 530 and the front surface of the fan portion 520 continue to be in contact with each other.

Figure 33:
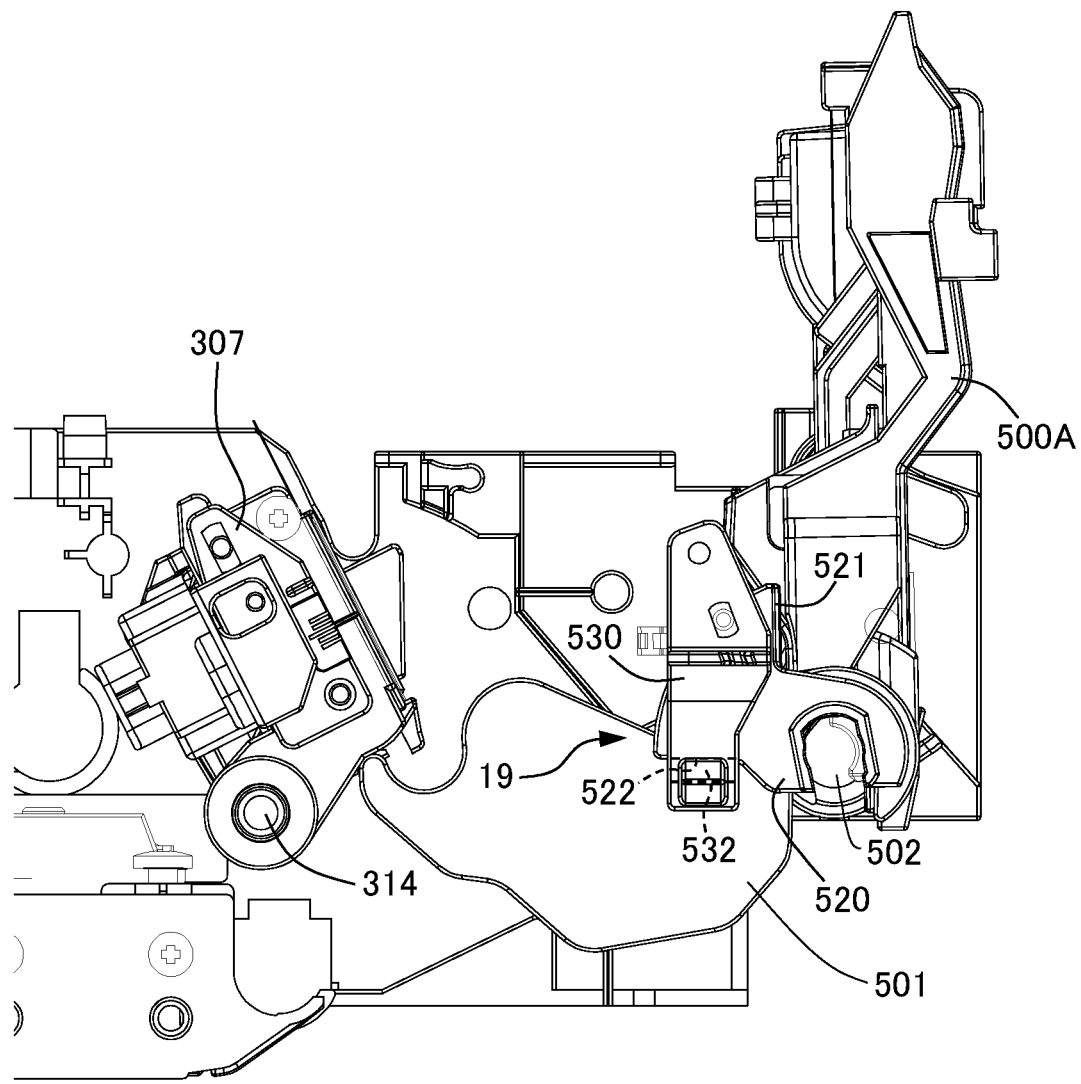
FIG. 33 is a front view illustrating a state where the second reading unit and the separation guide member of the other embodiment are located in open positions.

As illustrated in FIG. 33, if the separation guide member 500A is further pivoted and opened by about 90 degrees, the leading-edge portion 533 of the stopper 530 and the front surface of the fan portion 520 are no longer in contact with each other, and the second side 522 of the fan portion 520 and the second surface 532 of the stopper 530 contact each other. If a user releases the separation guide member 500A from his/her hand, the self-supporting state of the separation guide member 500A is kept in a state where the second side 522 of the fan portion 520 is in contact with the second surface 532 of the stopper 530. This is because the elastic force of the stopper 530 is stronger than the self-weight of the separation guide member 500A and the like. That is, since the setting is performed so that the holding force of the stopper 530 endures the weight of components, including the CIS 311, the stopper 530 can hold the separation guide member 500A. Thus, in a state where the separation guide member 500A is held in the second open position, the separation guide member 500A is held by the elastic force of the stopper 530, in a position to which the fan portion 520 has climbed over the stopper 530 after abutting against the stopper 530 on the movement trajectory.

The fan portion 520 and the stopper 530 do not wear even if the separation guide member 500A is further pivoted repeatedly. Thus, the holding of the separation guide member 500A can be kept. In addition, while the separation guide member 500A is being pivoted, the fan portion 520 always receives force from the leading-edge portion 533 of the stopper 530. Thus, the damper effect is produced, so that the impact caused by closing the separation guide member 500A can be reduced.

The present invention can improve the workability of work performed by a user accessing the conveyance path to which the reading portion is exposed.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-147718, filed Sep. 16, 2022, and Japanese Patent Application No. 2023-99422, filed Jun. 16, 2023 which are hereby incorporated by reference herein in their entirety.

What is claimed is:

1. An image reading apparatus configured to read an image of a document conveyed in a conveyance path, the image reading apparatus comprising:
a reading portion including a transparent member and a reading sensor configured to read the image on a sheet through the transparent member, the reading portion being configured to pivot between a first closed position in which the transparent member forms a first area of the conveyance path and a first open position in which the transparent member is exposed to an outside of the image reading apparatus;
a first cover configured to pivot between a second closed position in which the first cover covers the reading portion and a second open position in which the first cover opens the reading portion;
a second cover configured to pivot between a third closed position in which the second cover forms a second area of the conveyance path other than the first area together with the first cover located in the second closed position and a third open position in which the second cover opens the second area; and
a restricting member configured to restrict movement of the first cover from the second open position to the second closed position.

2. The image reading apparatus according to claim 1, further comprising:
an interlocking member configured to move the reading portion from the first closed position to the first open position interlocked with movement of the first cover from the second closed position to the second open position.

3. The image reading apparatus according to claim 2, wherein in a state where movement of the first cover from the second open position to the second closed position is restricted by the restricting member, the reading portion is held in the first open position by the interlocking member.

4. The image reading apparatus according to claim 2, wherein the interlocking member is separated from the reading portion in a state where the first cover is positioned in the second closed position.

5. The image reading apparatus according to claim 2, wherein the interlocking member includes a first abutment portion and a second abutment portion, the first abutment portion being configured to abut against a lower surface portion of the reading portion and press the reading portion upward in a case where the reading portion is positioned in the first closed position, the second abutment portion being configured to abut against a side surface portion of the reading portion and press the reading portion to the first open position after the reading portion is pivoted by the first abutment portion.

6. The image reading apparatus according to claim 2, wherein the first cover includes a contacting portion, wherein the interlocking member is configured to pivot with respect to the first cover and include a contacted portion configured to be contacted with the contacting portion in a pivot direction, wherein in a case where the first cover pivots from the second closed position toward an intermediate position between the second closed position and the second open position, the contacting portion does not contact with the contacted portion, and wherein in a case where the first cover passes the intermediate position and pivots toward the second open position, the contacting portion contacts with the contacted portion and the interlocking member pivots in accordance with pivot of the first cover.

7. The image reading apparatus according to claim 1, further comprising a support portion configured to support the reading portion, the first cover, and the second cover, wherein the restricting member includes an engaging portion and an engaged portion, the engaging portion being disposed in the first cover and extended toward a direction orthogonal to a rotation axis of the first cover, the engaged portion being disposed in the support portion and with which the engaging portion is engaged.

8. The image reading apparatus according to claim 1, wherein the second cover is an outer cover configured to form a top surface of the image reading apparatus.

9. An image forming apparatus comprising:
the image reading apparatus according to claim 1; and
an image forming portion configured to form an image that has been read by the image reading apparatus, on a sheet.

10. The image reading apparatus according to claim 1, further comprising a support portion configured to support the reading portion, the first cover, and the second cover, wherein the restricting member includes an engaging portion formed on the first cover and an engaged portion disposed in the support portion so as to extend toward a direction of a rotation axis of the first cover.

11. The image reading apparatus according to claim 10, wherein the engaged portion is configured to elastically deform toward the direction of the rotation axis, and wherein in a state where the first cover is held in the second open position, the engaging portion is held by an elastic force of the engaged portion in a position to which the engaging portion has climbed over the engaged portion after abutting against the engaged portion on a movement trajectory of the engaging portion.

* * * * *